(12) United States Patent
McCormack et al.

(10) Patent No.: US 9,344,201 B2
(45) Date of Patent: May 17, 2016

(54) SHIELDED EHF CONNECTOR ASSEMBLIES

(71) Applicant: Keyssa, Inc., Campbell, CA (US)

(72) Inventors: Gary D McCormack, Tigard, OR (US); Roger D. Isaac, San Jose, CA (US)

(73) Assignee: KEYSSA, INC., Campbell, CA (US)

( * ) Notice: Subject to any disclaimer, the term of this patent is extended or adjusted under 35 U.S.C. 154(b) by 164 days.

(21) Appl. No.: 14/137,939

(22) Filed: Dec. 20, 2013

(65) Prior Publication Data

US 2014/0106680 A1   Apr. 17, 2014

Related U.S. Application Data

(63) Continuation-in-part of application No. 13/754,694, filed on Jan. 30, 2013.

(60) Provisional application No. 61/592,491, filed on Jan. 30, 2012.

(51) Int. Cl.
*H04B 15/00* (2006.01)
*H03H 7/00* (2006.01)
*H04B 5/00* (2006.01)

(52) U.S. Cl.
CPC .............. *H04B 15/00* (2013.01); *H04B 5/0031* (2013.01); *H01L 2223/6677* (2013.01); *H01L 2224/16225* (2013.01); *H01L 2224/16245* (2013.01); *H01L 2224/32225* (2013.01); *H01L 2224/32245* (2013.01); *H01L 2224/48091* (2013.01); *H01L 2224/48227* (2013.01); *H01L 2224/48247* (2013.01);
(Continued)

(58) Field of Classification Search
CPC .............. H03H 7/00; H01P 5/00; H01R 9/09; H01R 12/70–12/91; H01R 13/40; H04B 15/00; H04B 5/00; H04B 5/0012; H04B 5/0075

USPC ................................................. 333/24 R, 24 C
See application file for complete search history.

(56) References Cited

U.S. PATENT DOCUMENTS 6,538,609 B2 * 3/2003 Nguyen et al. ....... H01Q 1/1285
343/704
6,554,646 B1   4/2003 Casey
(Continued)

FOREIGN PATENT DOCUMENTS

WO   2010/124165   10/2010
WO   2013/162844   10/2013

*Primary Examiner* — Dean Takaoka
*Assistant Examiner* — Alan Wong
(74) *Attorney, Agent, or Firm* — Van Court & Aldridge LLP

(57) ABSTRACT

Shielded extremely high frequency (EHF) connector assemblies are disclosed herein. In some embodiments, a first extremely high frequency (EHF) shielded connector assembly configured to be coupled with a second EHF shielded connector assembly. The first EHF connector assembly can include a first EHF communication unit operative to contactlessly communicate EHF signals with a second EHF communication unit included in the second EHF shielded connector assembly. The first connector can include a connector interface that includes a configuration to interface with a respective connector interface of the second EHF shield connector assembly, and several different material compositions that, in conjunction with the configuration, provide shielding to prevent or substantially reduce EHF signal leakage when the first EHF assembly connector is coupled to the second EHF assembly connector and the first EHF communication unit is contactlessly communicating EHF signals with the second EHF communication unit.

28 Claims, 20 Drawing Sheets

(52) U.S. Cl.
CPC ............... *H01L 2224/73265* (2013.01); *H01L 2924/15311* (2013.01); *H01L 2924/181* (2013.01); *H01L 2924/3011* (2013.01); *H01L 2924/3025* (2013.01)

(56) References Cited

U.S. PATENT DOCUMENTS

| | | | |
|---|---|---|---|
| 9,225,120 B2 * | 12/2015 | Barr | ................ H01R 13/6585 |
| 2004/0020674 A1 | 2/2004 | McFadden et al. | |
| 2009/0111315 A1 * | 4/2009 | Kato et al. | ................ 439/368 |
| 2010/0159829 A1 | 6/2010 | McCormack | |
| 2011/0057291 A1 | 3/2011 | Siupsky et al. | |
| 2011/0090030 A1 * | 4/2011 | Pagani | ................ 333/24 R |
| 2011/0191480 A1 | 8/2011 | Kobayashi | |
| 2012/0290760 A1 * | 11/2012 | McCormack et al. | ................ H04B 5/0037 710/303 |

* cited by examiner

SHIELDED EHF CONNECTOR ASSEMBLIES

RELATED APPLICATION

This application is a continuation-in-part of U.S. patent application Ser. No. 13/754,694, filed Jan. 30, 2013. U.S. patent application Ser. No. 13/754,694 claims the benefit of U.S. Provisional Patent Application No. 61/592,491 filed Jan. 30, 2012. Each of the above-referenced patent applications is incorporated by reference in its entirety for all purposes.

FIELD OF THE INVENTION

The present disclosure relates to connectors for electronic devices and more specifically to systems and methods for controlling electromagnetic emissions in connectors connecting the electronic devices.

BACKGROUND

Advances in semiconductor manufacturing and circuit design technologies have enabled the development and production of integrated circuits (ICs) with increasingly higher operational frequencies. In turn, electronic products and systems incorporating such integrated circuits are able to provide much greater functionality than previous generations of products. This additional functionality has generally included the processing of increasingly larger amounts of data at increasingly higher speeds.

Many electronic systems include multiple printed circuit boards (PCBs) upon which these high-speed ICs are mounted, and through which various signals are routed to and from the ICs. In electronic systems with at least two PCBs and the need to communicate information between those PCBs, a variety of connector and backplane architectures have been developed to facilitate information flow between the boards. Such connector and backplane architectures introduce unwanted electromagnetic signal emissions that may interfere with other circuits and devices. When wireless communication links are used, excessive electromagnetic emissions may occur prior to as well as during interconnection between two circuits or devices.

BRIEF SUMMARY

Shielded extremely high frequency (EHF) connector assemblies are disclosed herein. In some embodiments, a first extremely high frequency (EHF) shielded connector assembly is configured to be coupled with a second EHF shielded connector assembly. The first EHF connector assembly can include a first EHF communication unit operative to contactlessly communicate EHF signals with a respective first EHF communication unit included in the second EHF shielded connector assembly. The first connector can include a connector interface that includes a configuration to interface with a respective connector interface of the second EHF shield connector assembly, and several different material compositions that, in conjunction with the configuration of the connector, provides shielding to reduce EHF signal leakage when the first EHF assembly connector is coupled to the second EHF assembly connector and the first EHF communication unit is contactlessly communicating EHF signals with the respective first EHF communication unit.

In another embodiment, the shielded EHF connector can include circuitry for detecting whether an EHF shield exists among two coupled pairs of connectors. For example, a device can include a connector for interfacing with another device, at least one EHF communication unit operative to contactlessly communicate EHF signals with at least one respective EHF communication unit included in the other device, a controller operative to control operation of the at least one EHF communication unit, and shield detection circuitry coupled to the controller and operative to detect whether an EHF shield is present.

BRIEF DESCRIPTION THE DRAWINGS

Having thus described communication between devices in general terms, reference is now made to the accompanying drawings, which are not necessarily drawn to scale, and wherein:

DETAILED DESCRIPTION

Figure 1:
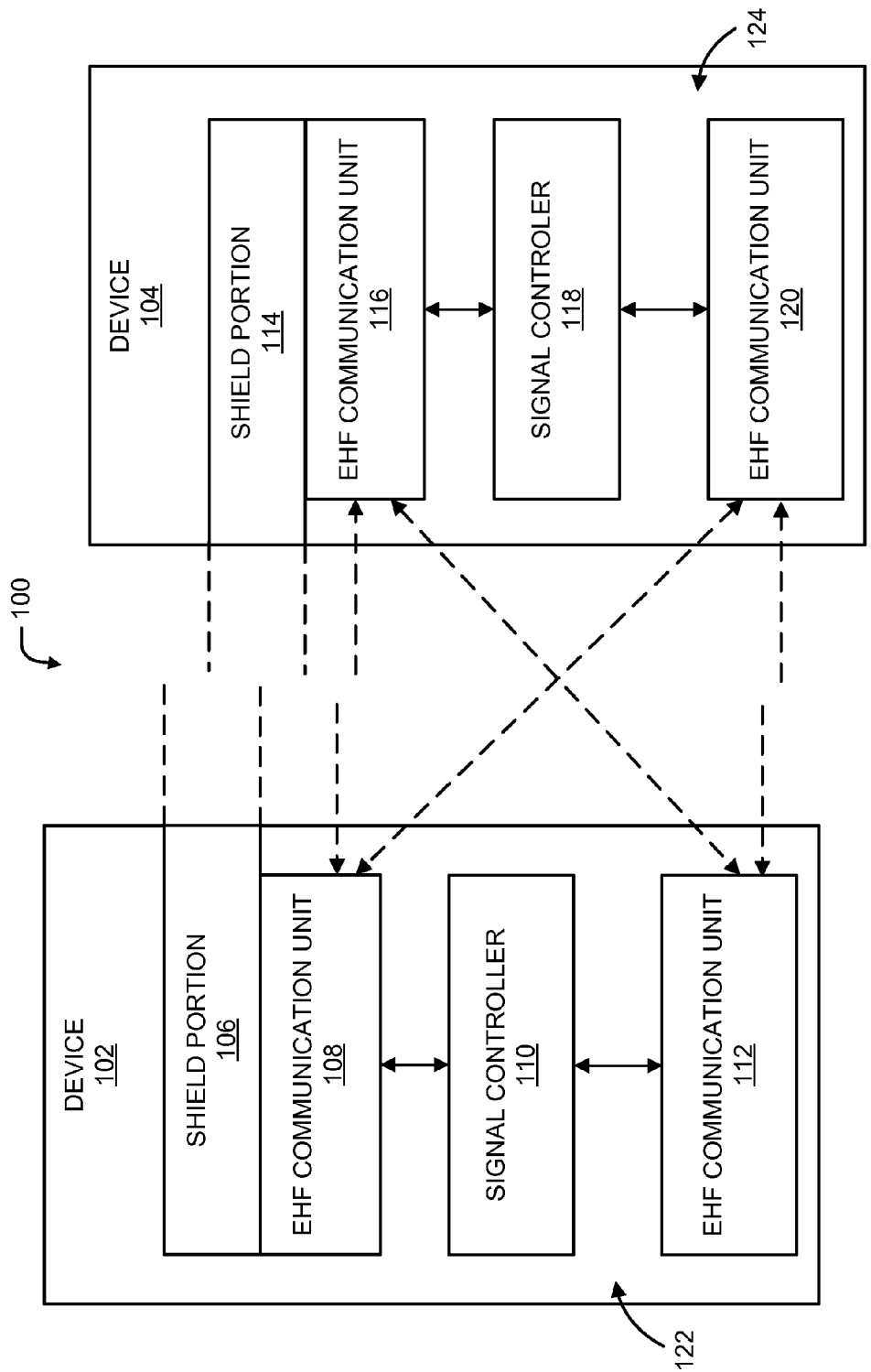
FIG. 1 illustrates an embodiment of a communication system.

Illustrative embodiments are now described more fully hereinafter with reference to the accompanying drawings, in which representative examples are shown. Indeed, the disclosed communication system and method may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

In today's society and ubiquitous computing environment, high-bandwidth modular and portable electronic devices are being used increasingly. Security and stability of communication between and within these devices is important to their operation. In order to provide improved secure high-bandwidth communications, the unique capabilities of wireless communication between electronic devices and between sub-circuits within each device may be utilized in innovative and useful arrangements.

Such communication may occur between radio frequency communication units, and communication at very close distances may be achieved using EHF frequencies (typically, 30-300 GHz) in an EHF communication unit. An example of an EHF communications unit is an EHF comm-link chip. Throughout this disclosure, the terms comm-link chip, and comm-link chip package are used to refer to EHF antennas embedded in IC chips or packages. Examples of such comm-link chips are described in detail in U.S. Patent Application Publication Nos. 2012/0263244; and 2012/0307932, both of which are hereby incorporated in their entireties for all purposes. Comm-link chips are an example of a communication device, also referred to as communication unit, whether or not they provide wireless communication and whether or not they operate in the EHF frequency band.

The acronym "EHF" stands for Extremely High Frequency, and refers to a portion of the electromagnetic (EM) spectrum in the range of 30 GHz to 300 GHz (gigahertz). The term "transceiver" may refer to a device such as an IC (integrated circuit) including a transmitter (Tx) and a receiver (Rx) so that the integrated circuit may be used to both transmit and receive information (data). Generally, a transceiver may be operable in a half-duplex mode (alternating between transmitting and receiving), a full-duplex mode (transmitting and receiving simultaneously), or configured as either a transmitter or a receiver. A transceiver may include separate integrated circuits for transmit and receive functions. The terms "contactless," "coupled pair," and "close proximity coupling" as used herein, refer to electromagnetic (EM) rather than electrical (wired, contact-based) connections and transport of signals between entities (such as devices). As used herein, the term "contactless" may refer to a carrier-assisted, dielectric coupling system which may have an optimal range in the zero to five centimeter range. The connection may be validated by proximity of one device to a second device. Multiple contactless transmitters and receivers may occupy a small space. A contactless link established with electromagnetics (EM) may be point-to point in contrast with a wireless link which typically broadcasts to several points.

The RF energy output by the EHF transceivers described herein may be below FCC requirements for certification or for transmitting an identification (ID) code which would otherwise interrupt data flow during the data transfer. Reference is made to 47 CFR §15.255 (Operation within the 57-64 GHz), which is incorporated by reference herein. The RF energy output can be controlled such that there is no need to beacon. The energy output can be controlled using, for example, metal and/or plastic shielding.

FIG. 1 illustrates a communication system 100. As shown, system 100 may include a first device 102 configured to couple to a second device 104. The first device 102 may be configured to communicate with and/or connect to the second device 104 and vice versa. Further, the first device 102 and the second device 104 can be electronic devices capable of connecting and communicating with each other. The first device 102 may include an electromagnetic shield portion 106, an EHF communication unit 108, a signal controller 110, and an EHF communication unit 112. Similarly, the second device 104 may include an electromagnetic shield portion 114, an EHF communication unit 116, a signal controller 118, and an EHF communication unit 120.

In this example, the signal controller 118 may be configured to communicate with the EHF communication unit 116 and the EHF communication unit 120 of the second device 104. Similarly, the signal controller 110 may communicate with the EHF communication unit 108 and the EHF communication unit 112 of the first device 102.

In some embodiments, each of the EHF communication unit 108, the EHF communication unit 116, the EHF communication unit 112, and the EHF communication unit 120 can be or may include an EHF transmitter and an EHF receiver. In such an example, a first or second device may include only one EHF communication unit. Further, the single or combination of two EHF communication units may be formed as a single integrated circuit and may be represented as a single communication unit or as separate communication units. The two EHF communication units 108 and 112 thus may be formed as a single communication circuit 122. Similarly, EHF communication units 116 and 120 may be formed as a single communication circuit 124. Though not shown, a person skilled in the art will appreciate that each of the first device 102 and the second device 104 may include any number of EHF communication units.

The EHF communication unit 108 may be configured for transmitting an unmodulated first electromagnetic EHF signal. As mentioned, the EHF communication unit 108 may be a receiver, transmitter, or a transceiver. The EHF communication unit 108 may transmit or receive one or more electromagnetic signals to/from the second device 104 or specifically from the EHF communication unit 116 and/or the EHF communication unit 120, using EHF near-field coupling. The shield portion 106 may surround at least a portion of the EHF communication unit 108, to provide electromagnetic shielding. Similarly, the shield portion 114 may surround at least a portion of the EHF communication unit 116. The EHF communication units 108 and 112 may be configured to communicate with the signal controller 110. Further, the EHF communication unit 112 can be a receiver, transmitter, or a transceiver. The EHF communication unit 112 may be configured to receive or transmit at least one electromagnetic EHF signal from/to other devices present in a predefined range of distance, for example within the near field. For example, the EHF communication unit 112 can receive or transmit one or more signals from/to the second device 104.

In one example, EHF communication unit 108 may be a transmitter configured to transmit an electromagnetic EHF signal, whether modulated or unmodulated, to EHF communication unit 116, which is configured as a receiver for receiving the electromagnetic EHF signal transmitted by the EHF communication unit 108. Correspondingly, EHF communication unit 120 may be a transmitter configured to transmit a modulated or unmodulated electromagnetic EHF signal to EHF communication unit 112, which is configured as a receiver for receiving the electromagnetic EHF signal transmitted by the EHF communication unit 120.

First and second devices may be configured as peers and have corresponding functionality, or they may be configured as host and client with different functionality. In one example, the signal controller 110 may perform one or more checks to authorize communication between the first device 102 and the second device 104. Further, the signal controller 110 may determine whether the second device 104 is an acceptable device when connected to the first device 102. The signal controller 110 may analyze the one or more signals received from the second device 104, such as from the EHF communication units 116 and/or 120. The signal controller of the second device 104 may analyze and/or process the electromagnetic signals received from the first device 102 or more specifically from the EHF communication unit 108 and/or 112.

The shield portion 106 and the shield portion 114 may be configured to effectively connect to each other, thus acting as a continuous shield portion rather than two separated shield portions, when the first device 102 and the second device 104 are aligned properly and preferably positioned proximate to or in contact with each other. Additionally, the signal controller 118 may further be configured for determining whether the shield portion 106 is in effective electrical contact with the shield portion 114, sufficiently to form a continuous shield when the first shield portion 106 and the second shield portion 114 are aligned relative to each other and preferably positioned proximate to or in contact with each other. In FIG. 1, the shield portion 106 is shown spaced apart from and in partial alignment with shield portion 114.

Signal controller 118 may be configured for determining whether an electromagnetic EHF signal received by EHF communication unit 116 indicates that the shield portion 106 and the shield portion 114 are in alignment. Further, the signal controller 118 may be configured to produce one or more modulation signals. In an embodiment, the signal controller 118 may generate a modulated electromagnetic EHF signal when the received electromagnetic EHF signal indicates that the shield portion 106 and the shield portion 114 are in alignment. In another embodiment, the signal controller 118 may disable transmission of a modulated electromagnetic EHF signal between devices 102 and 104 when the received electromagnetic EHF signal indicates that the shield portion 106 and the shield portion 114 are not in alignment.

The second EHF communication unit 116 when configured as a transceiver, or the fourth EHF communication unit 120, may further be configured to transmit an unlock code to the first device 102 when the second electromagnetic EHF signal is modulated. The unlock code may include a device identifier. In an embodiment, the communication unit 112 may receive the unlock code from the EHF communication unit 116. The signal controller 110 may authorize the second device 104 based on the unlock code. In some embodiments, the EHF communication unit 108 may transmit an unlock code to the second device 104 and either the EHF communication unit 116 or the EHF communication unit 120 may receive the unlock code. The signal controller 118 may authorize the first device 102 based on the received unlock code.

A signal controller of one of the devices may be configured to modulate an output or transmit an electromagnetic EHF signal contingent on meeting one or more predefined criteria. For example, the one or more predefined criteria may include matching at least one of a first data pattern, a first data rate, a first bit-error rate, and a first protocol of the first device 102 with a corresponding second data pattern, a second data rate, a second bit-error rate, and a second protocol of the second device 104. The one or more predefined criteria may include determining if strength of the received electromagnetic EHF signal is greater than a predefined threshold for a predefined time period. In an embodiment, the signal controller 118 may determine if strength of the received electromagnetic EHF signal is greater than a predefined threshold for a predefined time duration.

Figure 2:
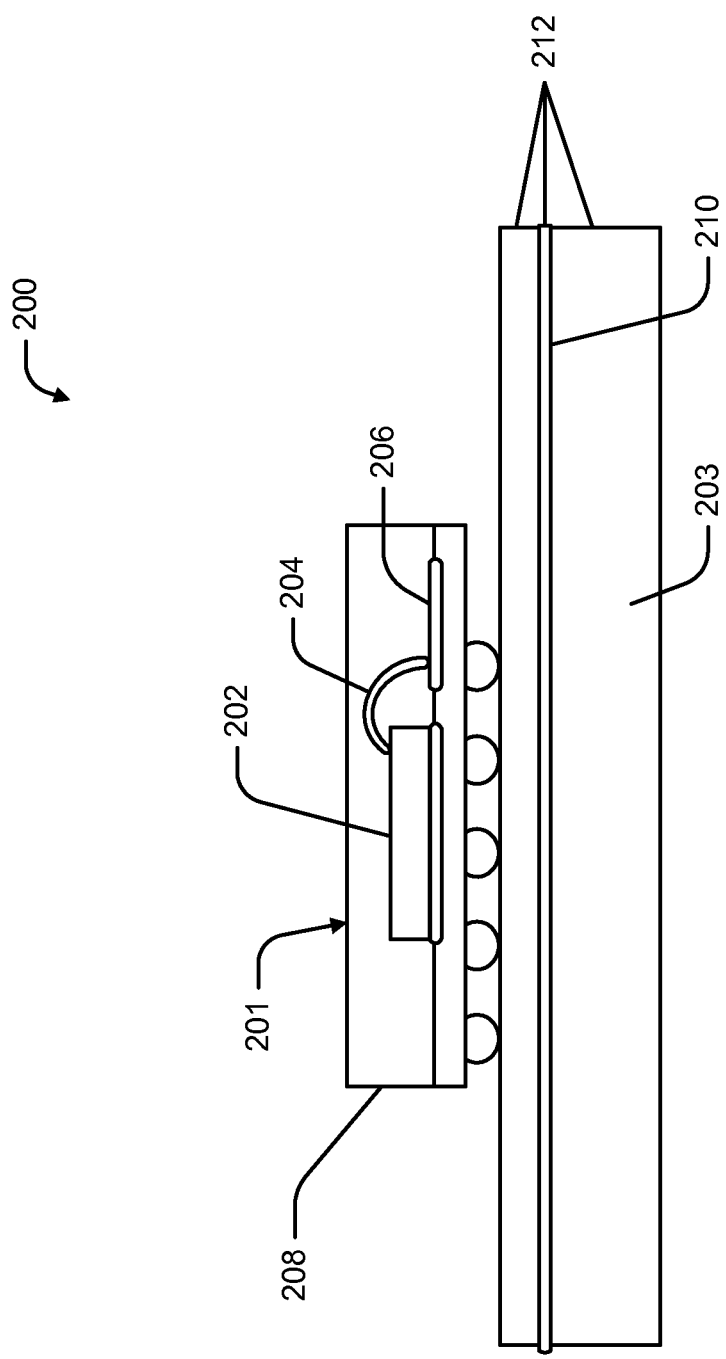
FIG. 2 is a side view of a first example of an EHF communication unit useable in the system of FIG. 1.

In some examples, the one or more predefined criteria or determination of whether the two devices are aligned may include detecting impedance of at least one of a first antenna of the first device 102 and/or a second antenna of the second device 104. In some embodiments, the signal controller 118 may detect impedance of at least one of the first antenna (such as antenna 206 as shown in FIG. 2 or antenna 306 shown in FIG. 3) and the second antenna. In some examples, the one or more predefined criteria may include determining and analyzing a time-of-flight for a round-trip EHF signal, i.e., for an electromagnetic EHF signal transmitted from one device to the other device and retransmitted back to the one device. The signal controller 118 may be configured to determine whether the received electromagnetic EHF signal indicates that the shield portion 106 and the shield portion 114 are in alignment. Further, the EHF communication unit 108 may be configured to transmit modulated signals to the second device 104 when the first device 102 and the second device 104 are in alignment.

In some embodiments, the signal controller of one of the devices may determine whether the other device is an acceptable or compatible device for communication. For example, the signal controller of one of the devices, such as signal controller 110, may determine whether an unlock code transmitted by the other device, such as transmitted by the EHF communication unit 116, is an acceptable unlock code. A signal controller may be configured to determine whether the electromagnetic EHF signal received from the other device is modulated with data formatted according to an acceptable qualification pattern.

Figure 5A:
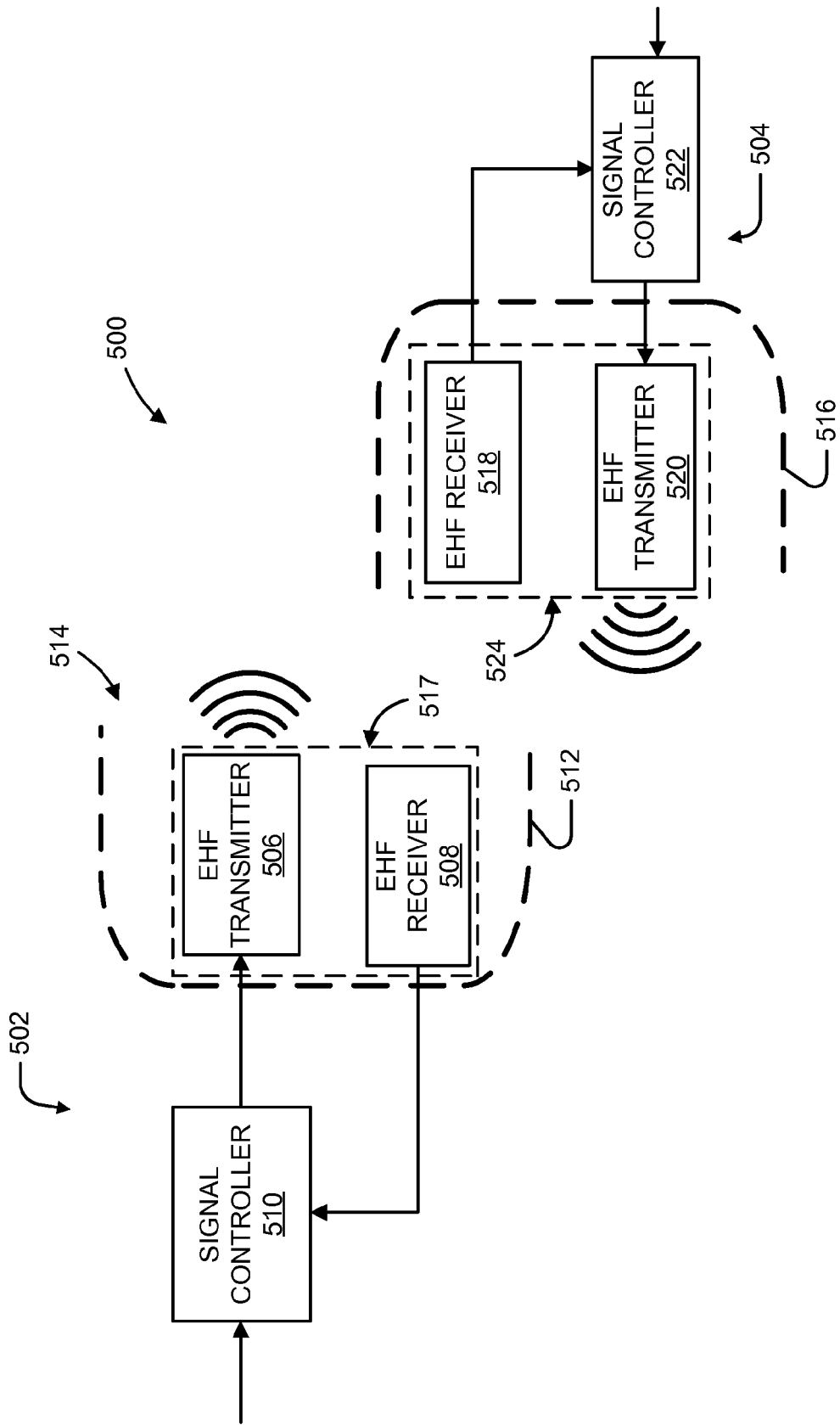
FIGS. 5A-5B are schematic illustrations showing a first device and a second device configured to reduce electromagnetic emissions.

In some embodiments, the user may move a position of at least one of the first device 102 and the second device 104 relative to each other when the generated electrical EHF signal indicates that the shield portion 106 and the shield portion 114 are not in alignment (See FIG. 5A). Further, the first device 102 and the second device 104 may be moved until the received electromagnetic EHF signal indicates that the shield portion 106 and shield portion 114 are in alignment (See FIG. 5B). The shield portion 106 and the shield portion 114 may form a continuous shield when aligned relative to each other and the shield portions are sufficiently close to each other.

The EHF communication unit 108 may transmit a modulated first electromagnetic EHF signal to the second device 104 in response to receipt by the first device 102 of a modulated second electromagnetic EHF signal from the second device 104. The first device 102 and the second device 104 may be configured such that alignment of the EHF communication unit 108 and the EHF communication unit 116 results in substantial alignment of the shield portion 106 and the shield portion 114. The material for the shield portion may be constructed of one or more of metal, plastic and dispersive materials.

The EHF communication unit 120 may be coupled to the signal controller 118 and may be configured to transmit the second electromagnetic EHF signal to the first device 102. The EHF communication unit 112 may be configured to receive the second electromagnetic EHF signal from the second device 104. The signal controller 110 may be configured to determine whether the first device 102 and the second device 104 are in alignment by assessing one or more characteristics of the second electromagnetic EHF signal transmitted by the EHF communication unit 120 and received by the EHF communication unit 112.

Figure 3:
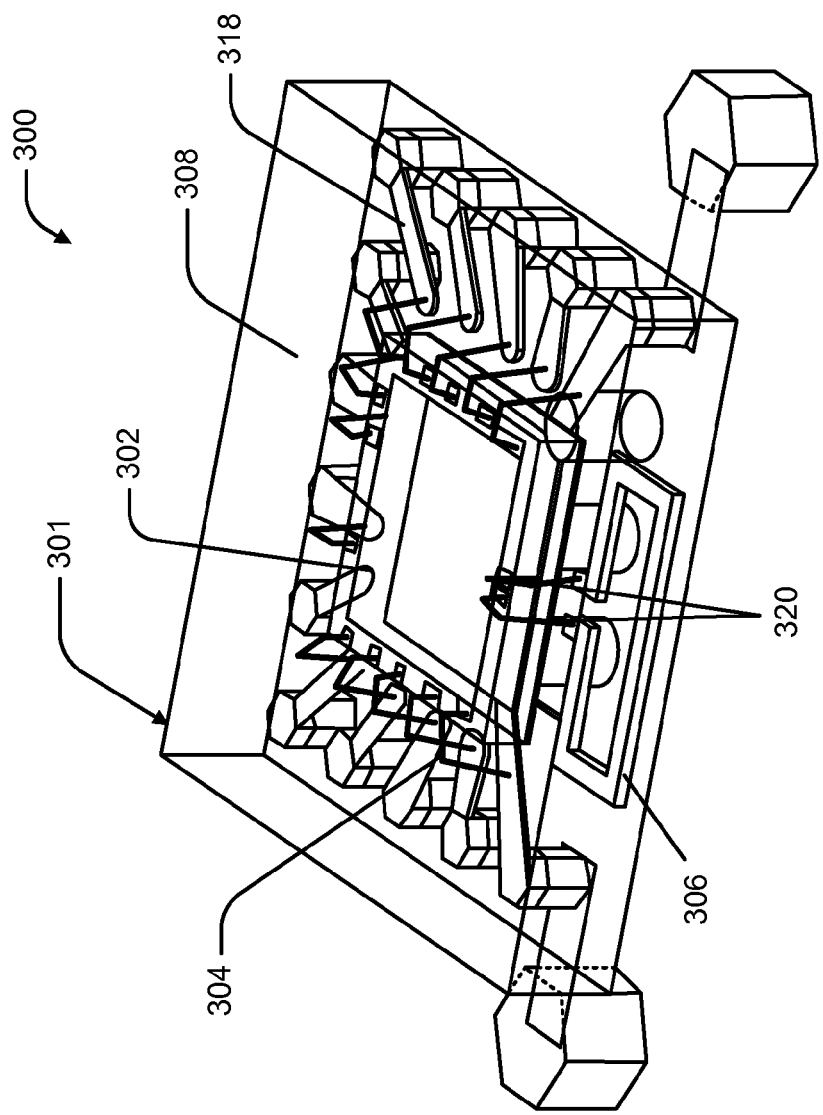
FIG. 3 is an isometric view of a second example of an EHF communication unit.

Each of the EHF communication units 108, 112, 116, and 120 may include an insulating material, a chip having an integrated circuit (IC), and an antenna configured to communicate with the IC and held in a fixed location by the insulating material as shown and described in FIGS. 2 and 3. In some embodiments, the first and second devices may have contact surfaces that interlock or mate when the first and second EHF communication units 108 and 116 are in alignment. The devices may also include one or more respective magnets to draw the devices together and/or LEDs for indicating a proper positioning between the devices.

FIG. 2 is a side view of an exemplary EHF communication circuit 200 showing a simplified view of some structural components. Communication circuit 200 may include one or more EHF communications units and may also include a signal controller as has been described for devices 102 and 104 in the communication system 100. As illustrated, the communication circuit may include an integrated circuit package 201 that includes a die 202 mounted on a connector printed circuit board (PCB) 203, a lead frame (not shown), one or more conductive connectors such as bond wires 204, a transducer such as antenna 206, and an encapsulating material 208.

The die 202 may include any suitable structure configured as a miniaturized circuit on a suitable die substrate, and is functionally equivalent to a component also referred to as a "chip" or an "integrated circuit (IC)." The die substrate may be formed using any suitable semiconductor material, such as, but not limited to, silicon. The die 202 may be mounted in electrical communication with the lead frame. The lead frame (similar to lead frame 318 of FIG. 3) may be any suitable arrangement of electrically conductive leads configured to allow one or more other circuits to operatively connect with the die 202. The leads of the lead frame may be embedded or fixed in a lead frame substrate. The lead frame substrate may be formed using any suitable insulating material configured to substantially hold the leads in a predetermined arrangement.

Further, the electrical communication between the die 202 and leads of the lead frame may be accomplished by any suitable method using conductive connectors such as, one or more bond wires 204. The bond wires 204 may be used to electrically connect points on a circuit of the die 202 with corresponding leads on the lead frame. In another embodiment, the die 202 may be inverted and conductive connectors including bumps, or die solder balls rather than bond wires 204, which may be configured in what is commonly known as a "flip chip" arrangement. The antenna 206 may be any suitable structure configured as a transducer to convert between electrical and electromagnetic signals. The antenna 206 may be configured to operate in an EHF spectrum, and may be configured to transmit and/or receive electromagnetic signals, in other words as a transmitter, a receiver, or a transceiver. In an embodiment, the antenna 206 may be constructed as a part of the lead frame. IC package 201 may include more than one antenna 206. In another embodiment, the antenna 206 may be separate from, but operatively connected to the die 202 by any suitable method, and may be located adjacent to the die 202. For example, the antenna 206 may be connected to the die 202 using antenna bond wires (similar to 320 of FIG. 3). Alternatively, in a flip chip configuration, the antenna 206 may be connected to the die 202 without the use of the antenna bond wires (see 320). In other embodiments, the antenna 206 may be disposed on the die 202 or on the PCB 203.

The encapsulating material 208 may hold the various components of the IC package 201 in fixed relative positions. The encapsulating material 208 may be any suitable material configured to provide electrical insulation and physical protection for the electrical and electronic components of the IC package. For example, the encapsulating material 208 may be a mold compound, glass, plastic, or ceramic. The encapsulating material 208 may be formed in any suitable shape. For example, the encapsulating material 208 may be in the form of a rectangular block, encapsulating all components of the IC package except the unconnected leads of the lead frame. One or more external connections may be formed with other circuits or components. For example, external connections may include ball pads and/or external solder balls for connection to a printed circuit board.

The IC package 201 may be mounted on a connector PCB 203. The connector PCB 203 may include one or more laminated layers 212, one of which may be a PCB ground plane 210. The PCB ground plane 210 may be any suitable structure configured to provide an electrical ground to circuits and components on the IC package. With the placement of the ground layer, at an appropriate distance from the antenna, the electromagnetic radiation pattern may be directed outwards from the substrate.

FIG. 3 is a simplified isometric view of another example of a communication circuit 300 showing some structural components. As with communication circuit 200, communication circuit 300 may include one or more EHF communications units and may also include a signal controller as has been described for devices 102 and 104 in the communication system 100. As illustrated, communication circuit 300 may include an IC package 301 that may in turn include a die 302, a lead frame 318, one or more conductive connectors such as bond wires 304, a transducer such as antenna 306, one or more antenna bond wires 320, and an encapsulating material 308. The die 302, the lead frame 318, one or more bond wires 304, the antenna 306, the antenna bond wires 320, and an encapsulating material may be functionally similar to components such as the die 202, the bond wires 204, the antenna 206, and the encapsulating material 208 of IC package 201, respectively, as described in FIG. 2. Further, communication circuit 300 may include a connector PCB similar to PCB 203, not shown).

In FIG. 3, it may be seen that the die 302 is encapsulated in encapsulating material 308, along with the bond wires 304 and 320. In this embodiment, the IC package may be mounted on the connector PCB. The connector PCB may include one or more laminated layers, one of which may be a PCB ground plane. The PCB ground plane may be any suitable structure configured to provide an electrical ground to circuits and components on the PCB. With the placement of the ground layer, at an appropriate distance from the antenna, the electromagnetic radiation pattern may be directed outwards from the substrate.

Signal security and integrity are important when communicating between any two EHF communication units. One method for enhancing or ensuring proper signal security and integrity is to verify that a second EHF communication unit is within a predetermined range of a first EHF communication unit before or during a communication. To that end, systems and methods may be used for detecting the presence of a second EHF communication unit and/or for ensuring another device or device surface is within a certain distance. Examples of such systems and methods are described in U.S. Published Patent Application No. 2012/0319496, which is hereby incorporated in its entirety for all purposes.

Figure 4A:
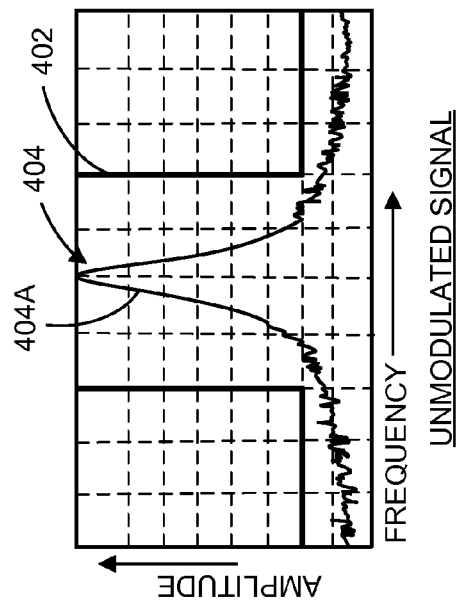
FIGS. 4A-4B depict two graphs of representative emissions spectra associated with an unmodulated signal and a modulated signal.
Figure 4B:
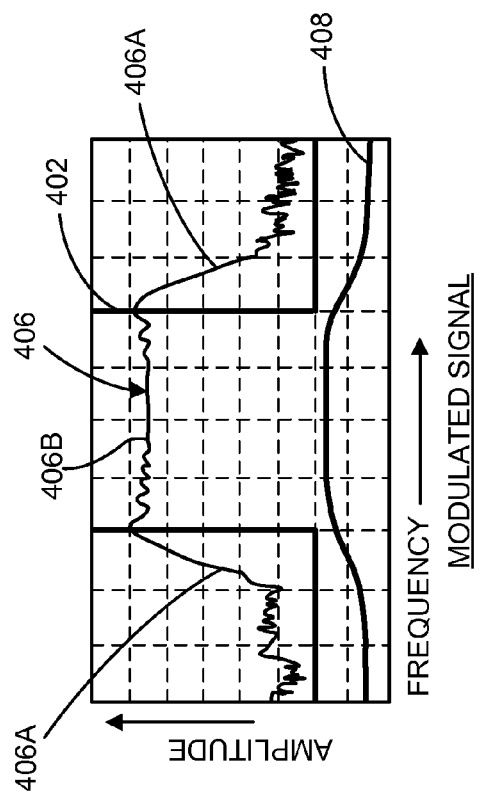

Turning to FIGS. 4A-4B, amplitude versus frequency graphs of typical emissions spectra are depicted, with superimposed lines 402 representing illustrative governmental emissions limits for a given licensed band. FIG. 4A depicts a graph of typical emissions spectra 404 for an unmodulated signal(s) or a low-level modulated signal. As depicted in FIG. 4A, an unmodulated signal or a sufficiently low-level modulated signal may include a narrow band 404A of emissions that are contained within the emissions limit 402. The modulated signal may be low-level in the sense that modulation occurs at a low frequency so as to produce a low level of electromagnetic emissions.

FIG. 4B depicts a graph of typical emission spectra 406 for a signal(s) modulated at frequencies commensurate with the information content the EHF carrier is able to convey, also referred to as a high-level modulated signal. It may be seen in FIG. 4B that a high-level modulated signal may produce a frequency band 406A that is outside the licensed band. It is desirable to avoid producing emissions outside the licensed band. A graphical representation 406 shows emissions within a shielded enclosure of frequency. An emissions band 406A of frequency spectra 406 is outside the licensed band and emissions band 406B is within the licensed band. For a communication circuit that is not shielded, a portion of frequency spectra is outside the licensed band when a high-level modulated signal is produced. When the communication circuit is shielded, frequency band 406 represents the frequency spectra inside the shielded enclosure, and spectra 408 shows the frequency spectra outside the shielded enclosure. It is seen that when a shielded enclosure is used, the frequency spectra outside the shielded enclosure is within the emissions limits 402.

Figure 5B:
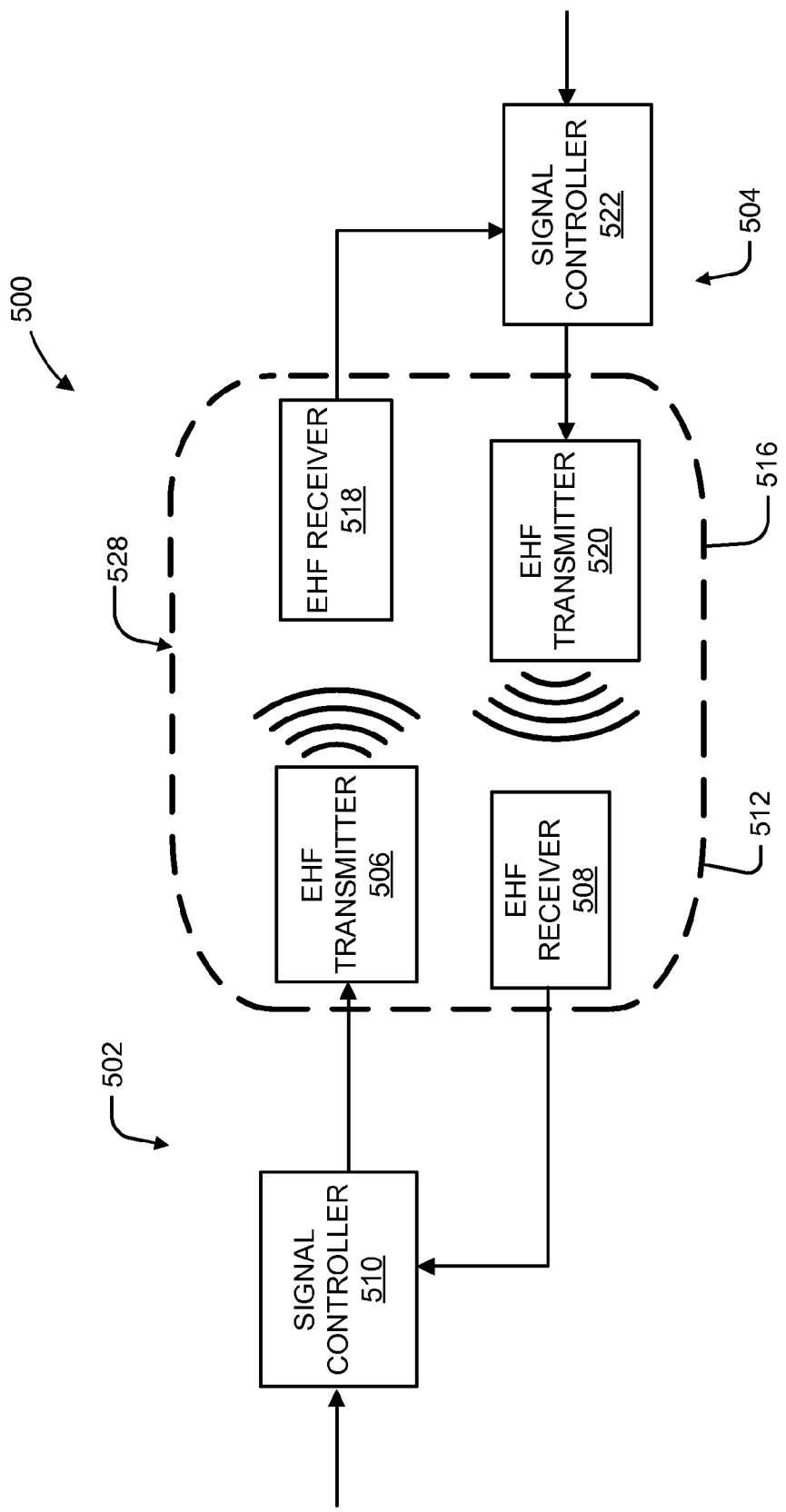

FIGS. 5A-5B are schematic illustrations of an exemplary communication system 500 showing a first device 502 relative to a second device 504 configured to avoid producing emissions outside a given band when properly aligned relative to each other. The first device 502 may include two exemplary communication units, specifically an EHF transmitter 506 and an EHF receiver 508, electrically connected to a signal controller 510. A discontinuous shield portion 512 may partly surround the EHF transmitter 506 and the EHF receiver 508. In some examples, the shield portion may also extend around signal controller 510.

For example, a portion of first device 502 may include a layer or section of material that acts to inhibit or block electromagnetic signals. This layer or section may be discontinuous in the sense that it may not form a continuous shield in every direction, but rather can include an opening or openings 514 in one or more directions along which electromagnetic EHF signals are transmitted from transmitter 506 and transmitted to receiver 508. This configuration is represented in FIG. 5A by a U-shaped cross section. As shown in the figure, the shield portion 512 (corresponding to shield portion 106) may be constructed to facilitate a mating relationship with a corresponding shield 516 (corresponding to shield portion 114) on second device 504. The shield portions 512 and 516 are discontinuous shields and may not adequately shield transmissions between the first device 502 and the second device 504 when the shield portions are not aligned. FIG. 5A shows the devices and thereby the shield portions out of alignment. Therefore, the first device and the second device may be moved until a proper alignment is established between the two devices, as shown in FIG. 5B.

The EHF transmitter 506 may be an example of the previously described EHF communication unit 108, and may be adapted to transmit selectively a modulated and an unmodulated EHF signal provided by one or more circuits in the first device 502 upstream to the signal controller 510. For example, the EHF transmitter 506 may transmit a substantially constant signal, a modulated signal, an intermittent signal, a combination of these, or any other signal capable of being transmitted in the licensed EHF band.

The EHF receiver 508 may also be an example of the previously described EHF communication unit 112, and may be adapted to receive an EHF signal and to provide that signal in electronic form to one or more circuits in the first device 502, including the signal controller 510. The signal controller 510 may determine whether an unmodulated signal received by EHF receiver 508 is adequate to enable modulation of transmitted signals. Transmitter 506 and receiver 508 may form a communication circuit 517.

The second device 504 may be similar to the first device 502, and may include an EHF receiver 518, an EHF transmitter 520, a signal controller 522, as well as shield portion 516—with similar functions and connections as the corresponding components of the first device 502. Receiver 518 and transmitter 520 may be part of a communication circuit 524. The signal controller 522 may also be configured to receive modulated or unmodulated signals from receiver 518 that are received from other devices such as, but not limited to the first device 502.

In some embodiments, the signal controller 510 of the first device 502 may determine whether the second device 504 is an acceptable or compatible device. In an embodiment, the signal controller 510 may determine whether the second device 504 is an acceptable device based on an unlock code. The unlock code may be a device identifier that can include alphanumeric data, symbols, or a combination of these. The signal controller 510 may determine whether the unlock code transmitted by the EHF transmitter 520 is an acceptable unlock code. The signal controller 510 may be configured to determine whether an electromagnetic EHF signal received by receiver 508 is modulated based on the one or more predefined criteria. For example, the signal controller may be configured to determine whether the received electromagnetic EHF signal is modulated with data formatted according to an acceptable qualification pattern.

Devices 502 and 504 may be changed or moved relative to each other when an EHF signal generated from a received electromagnetic EHF signal indicates that shield portions 512 and 516 are not in alignment. The devices may be moved until the generated EHF signal indicates that shield 512 and shield 516 are in alignment. When the devices are in alignment, the shield portions 512 and 516 may form a continuous shield 528 (as shown in FIG. 5B) that reduces the amount of emissions, as was described with reference to FIGS. 4A and 4B. The transmitter signal power may be calibrated to within a predetermined threshold to ensure that the connection is only made once shield 512 and 516 are in alignment.

The EHF transmitter 506 may transmit a modulated electromagnetic EHF signal to the second device 504 in response to receipt by the first device 502 of a modulated electromagnetic EHF signal from the second device 504. The devices 502 and 504 may be configured such that alignment of the EHF transmitter 506 and the EHF receiver 518 results in substantial alignment of shield portions 512 and 516

The signal controller 510 may be configured to determine whether the devices 502 and 504 are in alignment by assessing one or more characteristics of an electromagnetic EHF signal transmitted by EHF transmitter 520 and received by EHF receiver 508.

The alignment of devices 502 and 504 refers to axial and proximal alignment of the EHF transmitter/receiver pairs, namely EHF transmitter 506 with EHF receiver 518 as well as EHF transmitter 520 with EHF receiver 508. The proper alignment of these pairs may allow EHF signal communication between at least one of the pairs of transmitter and receiver and thus communication between the two devices. The shield portions 512 and 516 of the two devices, respectively, may also be configured to ensure that the shield portions are aligned and form a continuous shield 528 when the transmitter/receiver pairs are in proper alignment. Further, the shield portions may be configured to be in electrical contact when they are aligned relative to each other.

As mentioned previously, the discontinuous shield portions may form a continuous shield 528 around the transmitter/receiver pairs as shown in FIG. 5B when the shield portions are in an aligned and mated position. The continuous shield 528 around the EHF transmitter/receiver pairs may block spurious emissions sufficiently to comply with regulation emission limits. Thus, when the devices are properly aligned, the EHF transmitters may transmit modulated EHF signals or carriers without violating emission limits.

Further as has been mentioned, one or both of the devices may determine whether the other device is an acceptable device based on one or more criteria. When the devices are properly aligned, the respective signal controller may determine that the received signal is properly qualified and may enable modulation and produce a modulated EHF signal accordingly. Thereafter, the modulated EHF signal may be transmitted by the respective EHF transmitter to the counterpart receiver.

In an embodiment, the signal controller and EHF communication unit(s) in one or both of the devices may be adapted to provide verification of transmitter/receiver alignment. This may in turn provide a corresponding verification that physical shielding is also in proper alignment. This may allow the device to avoid transmission of modulated signals except when the shielding is in place to prevent excessive signals from being broadcast outside the licensed band. Taking device 502 as an illustrative example, this may be accomplished by configuring the signal controller 510 to output an unmodulated (or low level modulated) signal stream to transmitter 506 until the EHF receiver 508 receives and passes along an indication of receipt of a qualified signal transmission from device 504. In this example, the qualified signal may be transmitted by EHF transmitter 520. A transmitted signal may be checked to determine whether it meets certain predetermined criteria such as transmission strength or whether it includes one or more pieces of certain encoded information pertinent to the qualification determination.

In response to determining that a received transmission is qualified, the signal controller 510 may select a modulated signal stream to be passed to EHF transmitter 506 and transmitted. Likewise, signal controller 522 of device 504 may be configured to look for a qualified signal from device 502, and may only transmit a modulated signal via EHF transmitter 520 in response to that qualified signal. As previously described, this mutual arrangement results in the reduction of modulated transmissions unless the transmitter/receiver pairs are aligned and the respective devices transmit in compliance with the qualification criteria.

Figure 6:
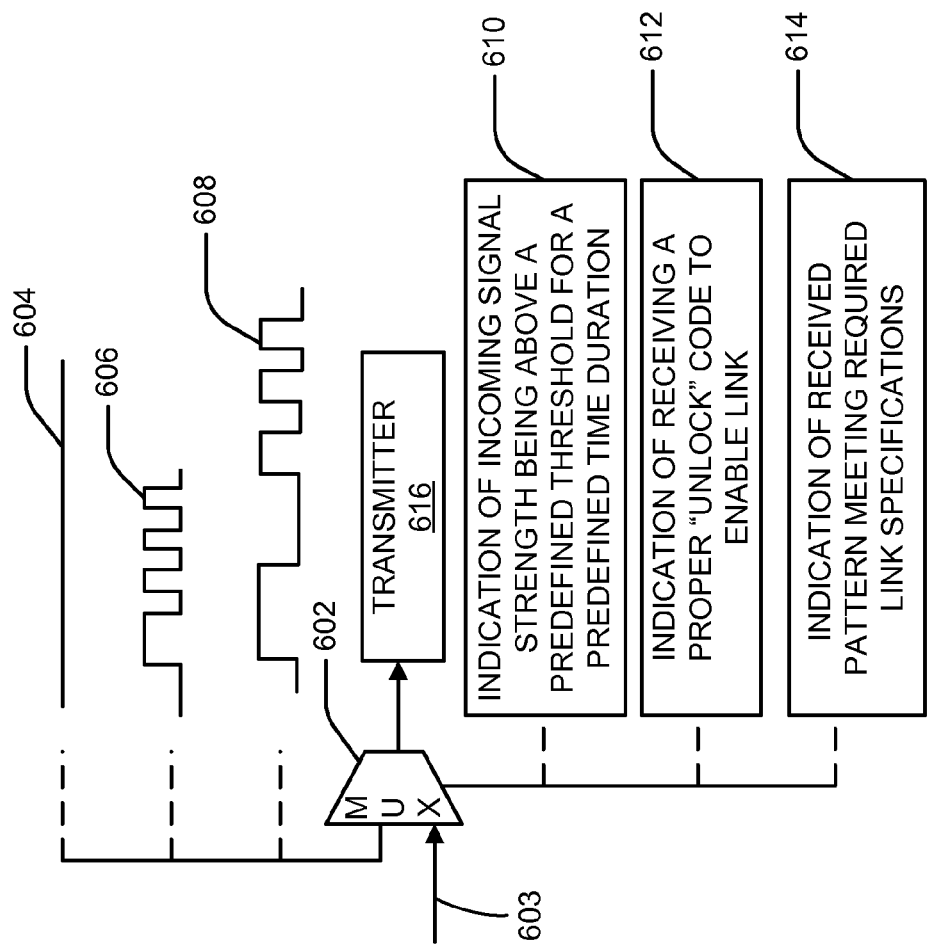
FIG. 6 is a schematic illustration of an exemplary multiplexer circuit that may be used in a signal controller.

The signal controller 522 and the signal controller 510 may be any suitable circuit configured to select between two or more signals based on one or more inputs. In the embodiment shown in FIGS. 5A and 5B, a signal controller may include a multiplexer circuit (MUX) 602 as shown in FIG. 6. As discussed with reference to FIGS. 5A and 5B, the multiplexer circuit 602 may be adapted to receive inputs or signals on an input 603, such as signals from one or more signal generating circuits (not shown). The signal generating circuits may produce a modulating data baseband signal (not shown). The multiplexer circuit may further receive different types of input signals from which one is selected for transmitting to the associated transmitter, such as EHF transmitter 506 for signal controller 510. These signals may include an exemplary pilot-tone signal input 604 that is an unmodulated carrier tone that produces emissions within a license-free band without relying on an electromagnetic shield. A logic 1 may be produced in signal input 604 to provide a simple unmodulated signal or carrier 604 received by the multiplexer circuit. A data sequence 606 may indicate an unlock code for transmitting to a second device, such as second device 504. Another data sequence 608 may indicate a link enumeration or a qualification sequence or qualification pattern for transmitting to the second device.

As discussed with reference to FIGS. 1, and 5A and 5B, the signal controller 522 may determine whether one or more criteria are satisfied before sending the first device a modulated data signal. A modulated output signal may be produced when the one or more criteria are satisfied. In an embodiment, the multiplexer circuit 602 may also receive indication signals 610, 612, and 614 that result from a determination of the characteristics of signals received from the second device, such as device 504.

In an embodiment, criteria determination circuits of the signal controller may provide the indication signals 610, 612, and 614 to the multiplexer 602. Indication signal 610 may provide an indication as to whether a received EHF electromagnetic signal strength is above a predefined threshold for a predefined time duration. Indication signal 612 may provide an indication as to whether a received EHF electromagnetic signal includes a proper unlock code. Indication signal 614 may provide an indication as to whether a received pattern meets a required link specification.

Figure 7:
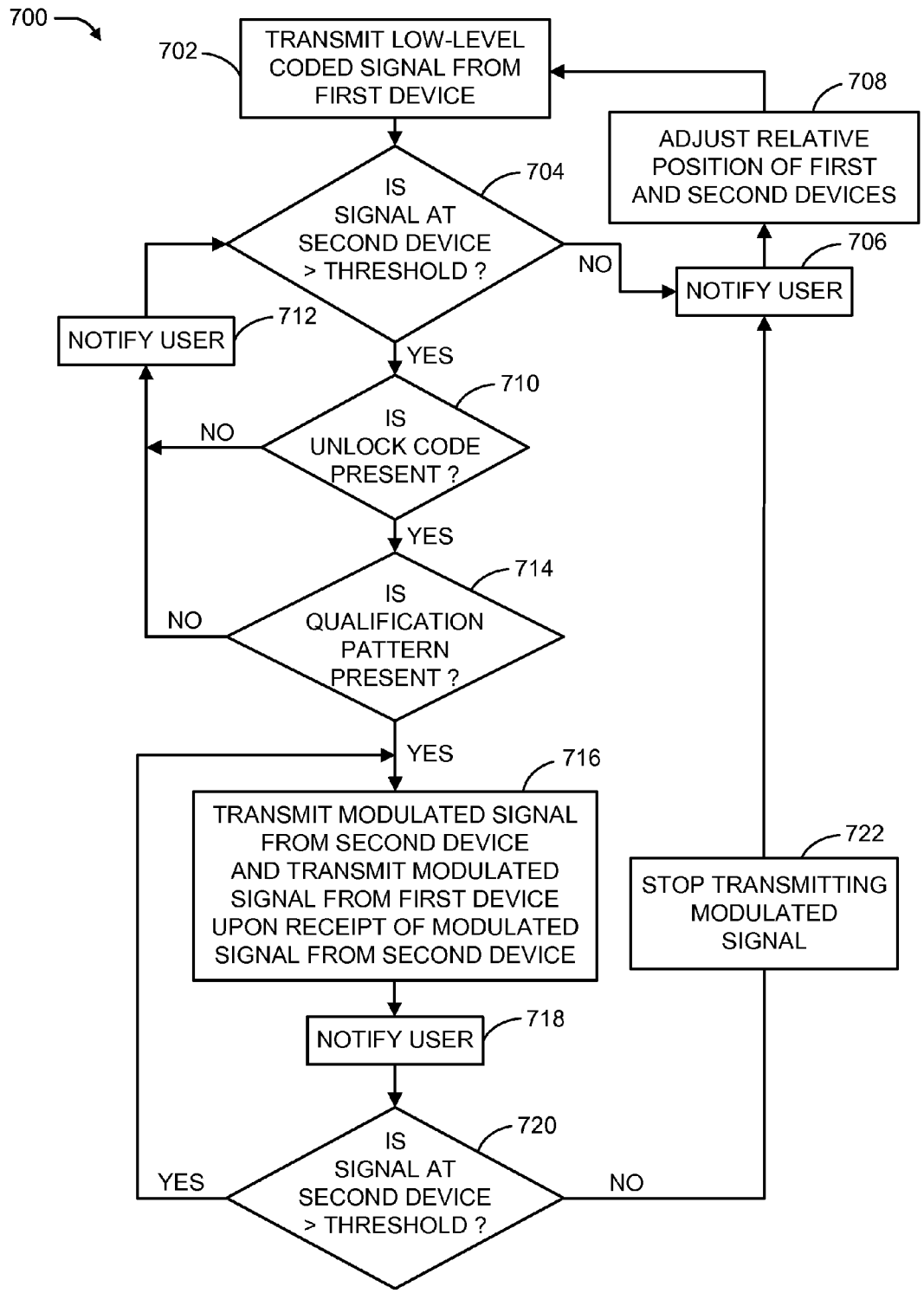
FIG. 7 is a flow chart illustrating an example of a method for communicating between the first device and the second device while reducing the production of electromagnetic emissions.

FIG. 7 is a flow chart illustrating an example of a method 700 for allowing communication between the first device 102 (or 502) and the second device 104 (or 504) while avoiding or reducing the production of electromagnetic emissions that are outside a licensed band. As discussed with reference to FIG. 1, the first device 102 (502) may include the EHF communication unit 108 (transmitter 506), the shield portion 106 (or 512), the signal controller 110 (or 510), and in some examples the EHF communication unit 112 (receiver 508). Similarly, the second device 104 (504) may include the shield portion 114 (516), the EHF communication unit 116 (receiver 518), the signal controller 118 (522), and in some examples the EHF communication unit 120 (transmitter 520). The device 102 (502) and the device 104 (504) may communicate with each other by transmitting and/or receiving electromagnetic signals.

At step 702, a low-level modulated signal or carrier may be transmitted by the first device 102 (502). The modulated signal is being transmitted initially without confirmation that the two devices are in alignment. As mentioned, the modulated signal may be low-level in the sense that modulation occurs at a low frequency so as to produce a low level of electromagnetic emissions. In this example, the EHF communication unit 108 (506) may transmit the modulated signal to the device 104 (504).

At step 704, it is determined whether the strength of the low-level modulated signal received by the receiver (such as, the EHF communication unit or receiver 116 or 518, or more generally at the second device 104 or 504) is over a predetermined threshold. In other words, the amplitude of a signal may be compared with a predefined minimum signal amplitude (or predefined threshold) to determine whether the signal meets the predefined threshold that indicates proper alignment of a transmitter/receiver pair. If the predefined threshold is not met, then the user may be notified at step 706, such as by a display, sound, light, or other sensible indicator. This may then prompt the user to adjust the relative position of the devices 102 (502) and 104 (504) at step 708, and the signal strength checked again at step 704 while the first device continues to transmit the low-level modulated signal at step 702. Since a user may move one or both of the devices, it is sufficient that the two devices are moved relative to each other. The second device may then continually monitor the signal strength and provide an indication as to whether alignment exists or continues to exist.

If at step 704 the signal strength is determined to be greater than the predefined threshold for a predefined duration of time, then step 710 is performed, and if not, the signal strength is monitored while a user continues to perform step 708 by further moving the devices. In some examples, the second device may also transmit an unmodulated signal or a low-level modulated signal back to the first device, upon receipt of which the first device makes determinations of the propriety of the second device, similar to those described, for sending data signals to the second device.

At step 710, the content of the signal may be analyzed to determine whether a desired, predefined unlock code is present. The unlock code would be data in the received low-level modulated signal. If at step 710 a desired unlock code is not present, then a user is notified at step 712, and step 704 is repeated and the signal is analyzed again.

It is also possible that a spurious signal, or a signal from an unsupported transmitter, may be present, and further adjustment of the relative positions of the first device 102 (502) and the second device 104 (504) may be ineffective to meet the above-identified tests without removing the source of the spurious signal.

At step 714, the signal may be further analyzed to determine whether an acceptable qualification pattern is present. If a proper qualification pattern is not present, then the user is notified with step 712 and the analysis returns to step 704 to continue checking the received signal for compliance with these tests. In some embodiments, when the proper qualification pattern is not present then adjustment of the relative device positions may or may not be needed.

Note that steps 704, 710, and/or 714 constitute aspects of qualifying the first device, and may be performed in a different order or even in parallel. It is also noted that different, fewer or additional criteria may be used to qualify the first device. For example, antenna impedance may be detected, or time-of-flight for a round-trip signal may be analyzed to determine whether the devices are sufficiently close, as is disclosed in U.S. Published Patent Application No. 2012/0319496, which reference is incorporated herein by reference.

If all criteria are satisfied, then at step 716 a modulated signal may be transmitted from the second device to the first device. Thereafter at step 718, a user may also be notified of proper alignment (i.e., that all criteria are met) by a suitable indicator. For example, an LED may be lit, an audible alert may be sounded, and/or a vibration may be created to notify the user about proper alignment of the two devices. The proper alignment of the first device 102 (502) and the second device 104 (504) may reduce or avoid the production of undesired emissions that are outside a licensed band by the limitation of transmitted emissions until formation of the continuous shield formed by the shield portions of the two devices is confirmed. Although not specifically shown, the first device may begin transmitting a low-level or high-level modulated first electromagnetic EHF signal to the second device in response to receipt by the first device of an electromagnetic EHF signal from the second device that is modulated at a corresponding low or high level.

As discussed above, during operation of the second device, the received signal is continually (or intermittently) monitored at step 720 to confirm that suitable alignment continues to exist. So long as the signal strength (or other determinant) is sufficient, the second device continues to transmit modulated signals to the first device. If at any time the signal strength diminishes below the threshold, the transmission of the modulated signal is terminated at step 722, the user is notified at step 706 for adjustment of the two devices by the user at step 708, and the process of linking the two devices is re-initiated at step 702.

Figure 8:
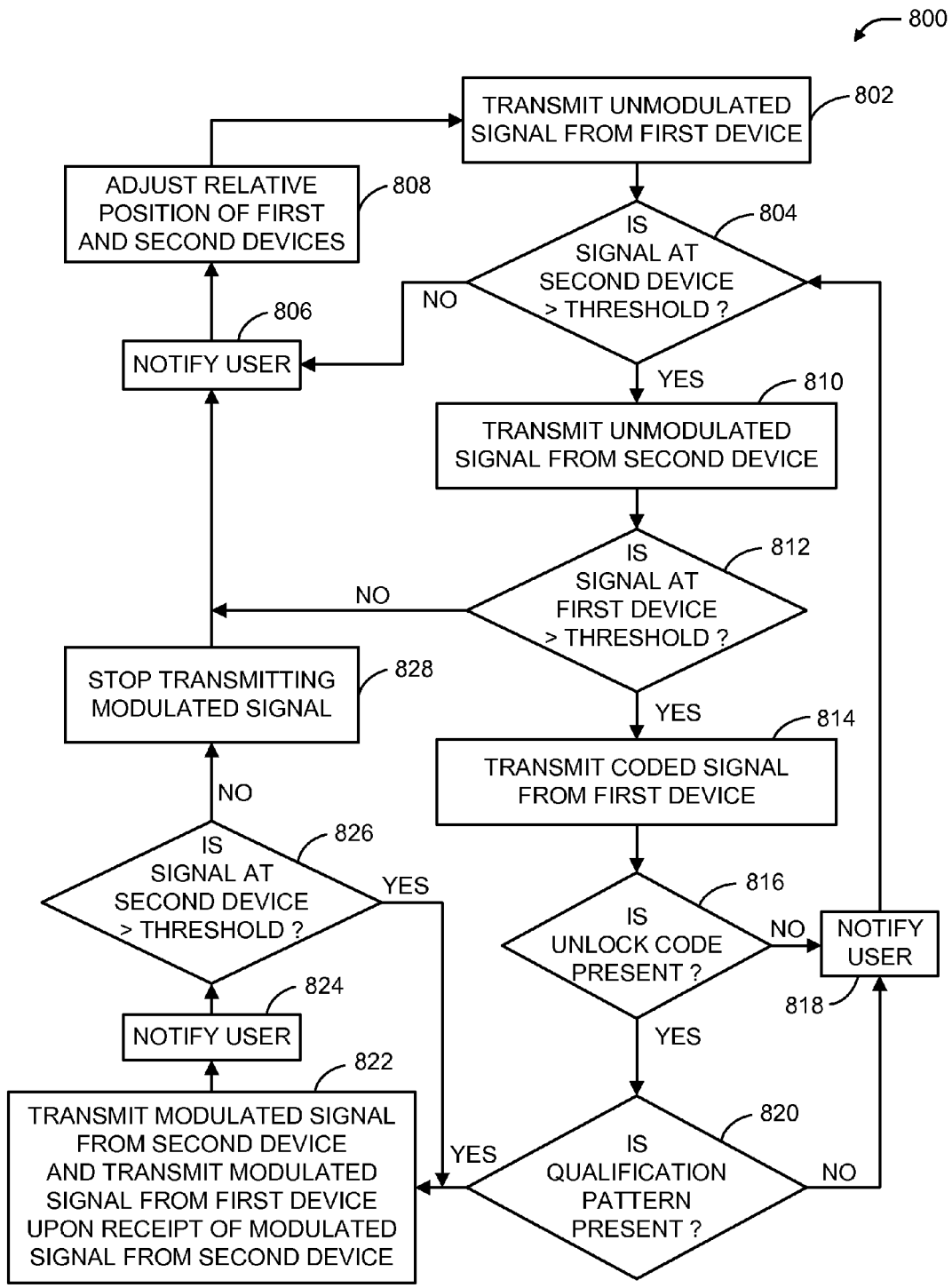
FIG. 8 is a flow chart illustrating another example of a method for communicating between the first device and the second device while reducing the production of electromagnetic emissions.

FIG. 8 is a flow chart illustrating another example of a method 800 for allowing communication between the first device 102 (or 502) and the second device 104 (or 504) while avoiding or reducing the production of electromagnetic emissions that are outside a licensed band. In this example, at step 802, an unmodulated signal or carrier may be transmitted by the first device 102 (502). The unmodulated signal is being transmitted initially without confirmation that the two devices are in alignment because it inherently produces low levels of emissions even when the devices do not form an electromagnetic shield. In this example, the EHF communication unit 108 (506) may transmit the modulated signal to the device 104 (504).

At step 804, it is determined whether the strength of the unmodulated signal received by the receiver (such as, the EHF communication unit or receiver 116 or 518, or more generally at the second device 104 or 504) is over a predetermined threshold. If the predefined threshold is not met, then the user may be notified at step 806. This may then prompt the user to adjust the relative position of the devices 102 (502) and 104 (504) at step 808, and the signal strength checked again at step 804 while the first device continues to transmit the unmodulated signal at step 802.

Since a user may move one or both of the devices, it is sufficient that the two devices are moved relative to each other. The second device may then continually monitor the signal strength and provide an indication as to whether alignment exists or continues to exist based on the signal strength. As also mentioned above, other criteria may be examined for determining alignment, such as antenna impedance or time-of-flight for a round-trip signal.

If at step 804 the strength of the signal received at the second device is determined not to be greater than the predefined threshold, the second device continues to monitor the received signal strength at step 804 while a user continues to move the devices at step 808. If the received signal strength is determined to be greater than the predefined threshold, then the second device may in turn transmit an unmodulated signal or even a low-level modulated signal to the first device at step 810 for use by the first device in determining whether it is appropriate to send data to the second device using similar steps.

Then, at step 812 a determination may be made at the first device as to whether the signal received from the second device is greater than a predefined threshold, and if not, the signal strength continues to be monitored while a user continues to perform step 808 by further moving the devices. If the signal received from the second device is greater than a predefined threshold, the first device may then begin transmitting a signal modulated with an unlock code and with a predefined qualification pattern at step 814. This signal may be a low-level modulated signal or it may be a high-level modulated signal.

After the second device has determined that the received signal has sufficient strength, at step 816, the content of the signal may be analyzed to determine whether a desired, predefined unlock code is present in the modulated signal received from the first device. If at step 816 a desired unlock code is not present, then a user is notified at step 818, and step 804 is repeated and the signal is analyzed again.

If the predefined unlock code is present in the signal, at step 816, the signal may be further analyzed at step 820 to determine whether an acceptable qualification pattern is present. If a proper qualification pattern is not present, then the user is notified at step 818 and the analysis returns to step 804 to continue checking the received signal for compliance with these tests. In some embodiments, when the proper qualification pattern is not present then adjustment of the relative device positions may or may not be needed.

If a required qualification pattern is present, then at step 822 the second device transmits a modulated signal containing data, including control and further handshake protocols to establish communication with the first device. A user may also be notified at step 824 with an indication that the two devices are aligned and communication is taking place. As in method 700, the first device may begin transmitting a high-level modulated first electromagnetic EHF signal to the second device in response to receipt by the first device of a high-level modulated second electromagnetic EHF signal from the second device.

During operation of the second device, the received signal is continually (or intermittently) monitored at step 826 to confirm that suitable alignment continues to exist. So long as the signal strength (or other determinant) is sufficient, the second device continues to transmit modulated signals to the first device. If at any time the signal strength diminishes below the threshold, the transmission of the modulated signal is terminated at step 828, the user is notified at step 806 for adjustment of the two devices by the user at step 808, and the process of linking the two devices is re-initiated at step 802.

Again, the steps shown for qualifying the first device for communication with the second device are exemplary, and may be performed in a different order or even in parallel. Also, different, fewer or additional criteria may be used to qualify the first device for communication.

At step 824, a user may also be notified of proper alignment (i.e., that all criteria are met) by a suitable indicator. For example, an LED may be lit, an audible alert may be sounded, and/or a vibration may be created to notify the user about proper alignment of the two devices. As discussed above, the proper alignment of the first device 102 (502) and the second device 104 (504) may reduce or avoid the production of undesired emissions that are outside a licensed band by the limitation of transmitted emissions until formation of the continuous shield formed by the shield portions of the two devices is confirmed.

Figure 9A:
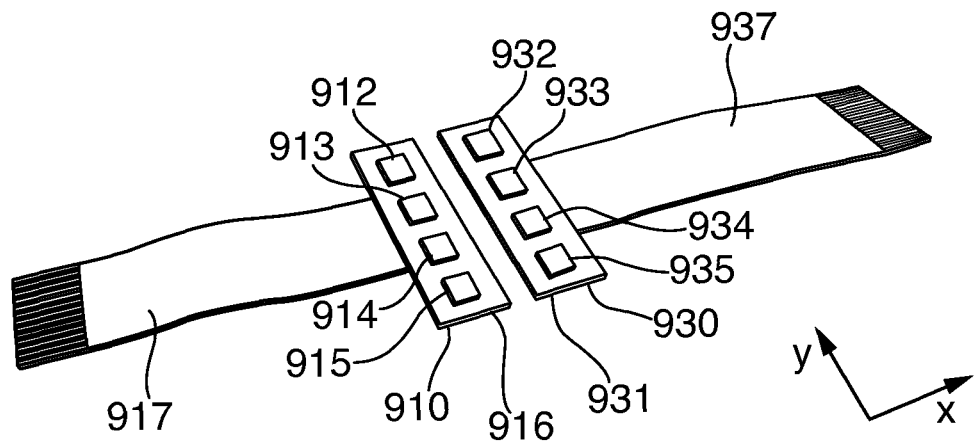
FIG. 9A show an illustrative EHF connector, according to an embodiment.

FIG. 9A shows two illustrative EHF connectors in accordance with an embodiment. In particular, FIG. 9A shows EHF connector assembly 910 and EHF connector assembly 930. EHF connector assembly 910 can include an array of EHF transceivers 912-915 mounted on substrate 916, and each EHF transceiver may be electrically coupled to a conductor in cable 917. Similarly, EHF connector assembly 930 can include an array of EHF transceivers 932-935 mounted on substrate 931, and each EHF transceiver may be electrically coupled to a conductor in cable 937. Any one of EHF transceivers 912-915 or 932-935 can be similar to EHF communication unit 200 (of FIG. 2) or EHF communication unit 300 (of FIG. 3). The number of EHF transceivers in each connector assembly can vary, as well as their arrangement. As shown in FIG. 9A, each connector assembly includes four EHF transceivers arranged in a row that runs parallel to the "y" axis of the coordinate marker shown in FIG. 9A, and which also runs perpendicular to the length of the cable. In other embodiments, such as that shown in FIG. 9B, EHF connector assembly 950 can include two EHF transceivers 952 and 953 arranged in a row that runs parallel with the length of cable 957. In yet another embodiment, not shown, an array of N×M EHF transceivers can be arranged on a substrate, which is attached to a cable. The N×M array can be, for example, a 2×2 array, a 2×3 array, or any other suitable array of EHF transceivers.

Figure 9B:
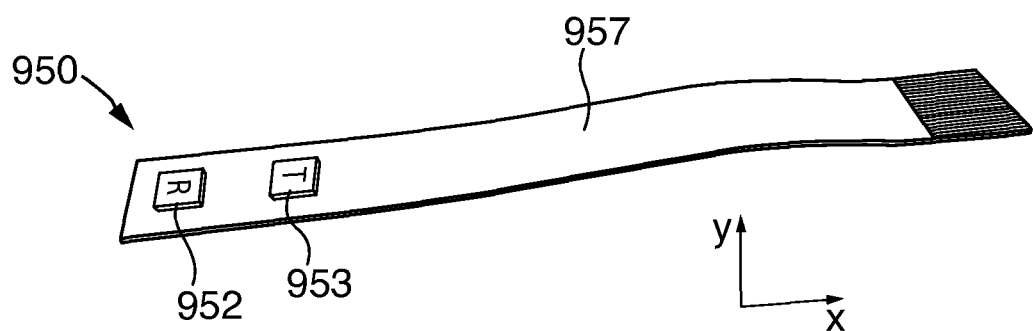
FIG. 9B show an alternative illustrative EHF connector, according to an embodiment.

The connector assemblies of FIGS. 9A and 9B can, for example, be included within a device or can be part of a cable assembly. Regardless of how the connector assemblies are used, the connector assemblies are shielded to reduce, mitigate, or prevent unwanted wireless emissions from radiating therefrom. Various shielding embodiments discussed herein below can minimize or eliminate unwanted wireless emissions when the connector assemblies are coupled together or are in operative communication with each other. In addition, shielding embodiments discussed herein can enable a coupled pair of connectors to operate at frequencies that they may not otherwise be permitted to operate at due to various restrictions (e.g., licensing or FCC mandated exclusions). Moreover, circuitry and methods for detecting integrity of shielding associated with a coupled pair of connectors are also discussed.

Figure 10:
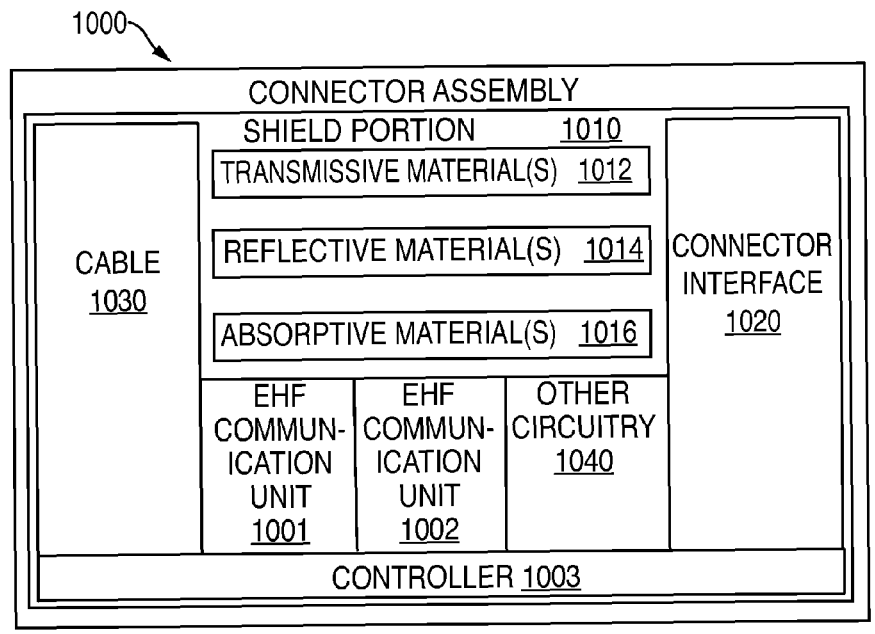
FIG. 10 shows an illustrative block diagram of a shielded connector assembly according to an embodiment.

FIG. 10 shows an illustrative block diagram of a shielded connector assembly according to an embodiment. As shown, shielded connector assembly 1000 can include many of the same components of device 102 or device 104, as discussed above, including, for example, EHF communication units 1001 and 1002, signal controller 1003, shield portion 1010, connector interface 1020, cable 1030, and other circuitry 1040. EHF communication units 1001 and 1002 may contactlessly communicate with respective EHF communication units of another connector assembly (not shown). These two connector assemblies may be referred to herein as a coupled pair of connector assemblies. Controller 1003 may control operation of EHF communication units 1001 and 1002, according to various embodiments. EHF communication units 1001 and 1002 may be similar to EHF communication units 108 and 112, respectively, of FIG. 1, and controller 1003 may be similar to signal controller 110 of FIG. 1.

Cable 1030 may be a cable that extends away from the connector assembly such that a distal end of the cable includes another connector. The other connector can be another connector assembly or it can be a completely different connector (e.g., a USB connector). In some embodiments, cable 1030 can include metal conductors for conveying data and/or power. In other embodiments, cable 1030 can include dielectric conductors for conveying EHF data signals. If desired, optional cable 1030 may be a set of leads that connect connector assembly 1000 to, for example, a printed circuit board within a device (e.g., a computer or a monitor).

Connector interface 1020 can include any suitable interface for mating to a connector interface of another connector assembly. Connector interface 1020 can be a male interface or a female interface. Regardless of a shape or orientation of a connector interface, when two connector interfaces are mated together, the coupled pair of connector assemblies can remain that way until they are separated. In some embodiments, connector interface 1020 may physically engage and connect to another connector interface via a mechanical retention force. In another embodiment, the connector interfaces of a coupled pair can be mated together via thumbscrews or a releasable latch, either of which may be used in conjunction with the mechanical retention force. In yet another embodiment, the connector interfaces of a coupled pair can be mated together using magnets or electromagnets.

The combination of EHF communication units 1001 and 1002, shield portion 1010, and connector interface 1020 may be arranged in a particular manner with respect to each other and/or exhibit particular physical dimensions to ensure that an EHF shield is provided when two connector assemblies are coupled together. For example, in some embodiments, connector interface 1020 may embody shield portion 1010. That is, connector interface 1020 may form part of an EHF shield.

Shield portion 1010 can be constructed from a combination of different materials to minimize or completely eliminate EHF leakage. These materials can include transmissive materials 1012 that are operable to facilitate propagation of EHF signals, reflective materials 1014 that are operable to reflect EHF signals, and absorptive materials 1016 are operable to absorb EHF signals. Examples of transmissive materials 1012 can include plastics and other materials that are electrically non-conductive (i.e., dielectric). Additional details of EHF transmissive or dielectric materials can be found, for example, in commonly owned, commonly assigned, U.S. patent application Ser. No. 13/963,199, filed Aug. 9, 2013, the disclosure of which is incorporated by reference herein in its entirety. Reflective materials 1014 can include, for example, metals, metal alloys, and other materials that are electrically conductive. Additional details of reflective materials can be found in commonly assigned, commonly owned, U.S. Patent Application Publication No. 20130278360, the disclosure of which is hereby incorporated by reference herein in its entirety. Examples of absorptive materials 1016 can include, for example, magnetically loaded, rubber materials that are electrically non-conductive, but exhibit effective EHF dampening resonance due to their high permittivity and permeability. A specific example of an absorptive material is sold as Eccosorb, by Emerson & Cuming Microwave Products of Randolph, Mass.

In some embodiments, shield portion 1010 can be constructed from just one of the different material types. For example, shield portion 1010 can be constructed from just the conductive material or just the reflective material. In other embodiments, shield portion 1010 can be constructed from two or more of the different material types. For example, shield portion 1010 can be constructed from transmissive and reflective materials, from transmissive and absorptive materials, or from reflective and absorptive materials. As yet another example, shield portion 1010 can be constructed from transmissive, reflective, and absorptive materials.

In some embodiments, shield portion 1010 can be constructed from an open celled material. The open cell construction may be such that the any gaps that serve as a transmission path is a fraction of the wavelength of any EHF signal attempting to pass through. If desired, the open celled material may be constructed from an adsorptive material to further enhance its EHF signal blocking capacity. In some embodiments, the open celled material may be air permeable but impenetrable to EHF signals. Thus, its usage in structures containing electronics requiring air-based cooling may be particularly advantageous. In some embodiments, the open celled material may be a foam that can be applied in various locations within an enclosure or connector as a liquid/gas mixture that can occupy "hard-to-reach" spaces, thereby enabling EHF signal containment.

For any coupled pair of connector assemblies, the selection of material types for a first connector assembly may be the same as for a second connector assembly. The material selection for both connector assemblies need not be identical in order to ensure an EHF leakproof shield exists between the two connectors. For example, for another coupled pair of connector assemblies, the selection of material types for a first connector assembly may be different than a selection of a material type for a second connector assembly. Thus, despite the use of different materials, a fully shielded connection may exist between the two connector assemblies. In some embodiments, the materials selected for both connector assemblies may be such that that they complement each other when the two connector assemblies are mated together.

Figure 11A:
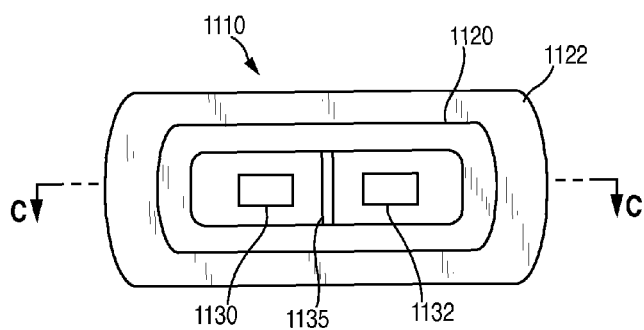
FIGS. 11A-11C show different views of an illustrative first connector 1110 according to an embodiment.
Figure 11B:
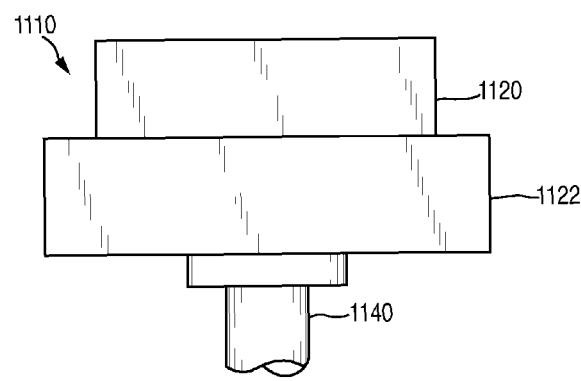
Figure 11C:
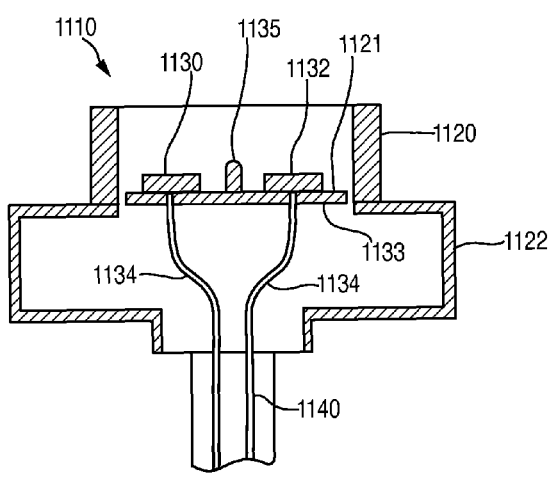
Figure 11D:
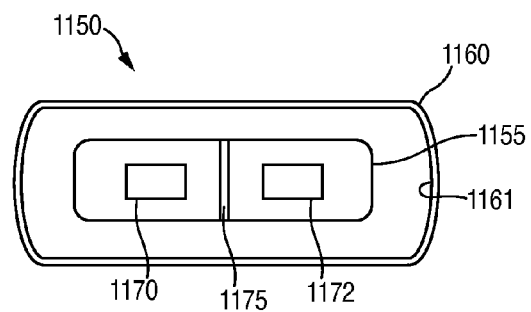
FIGS. 11D-11F show different views of an illustrative second connector 1150 according to an embodiment.
Figure 11E:
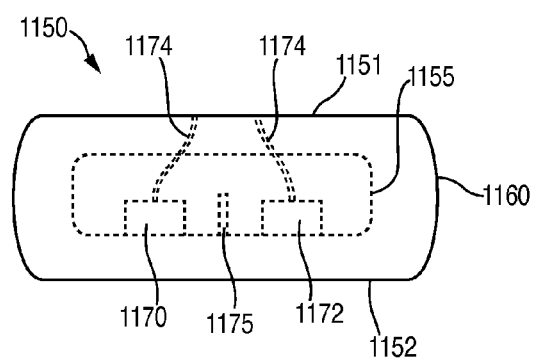
Figure 11F:
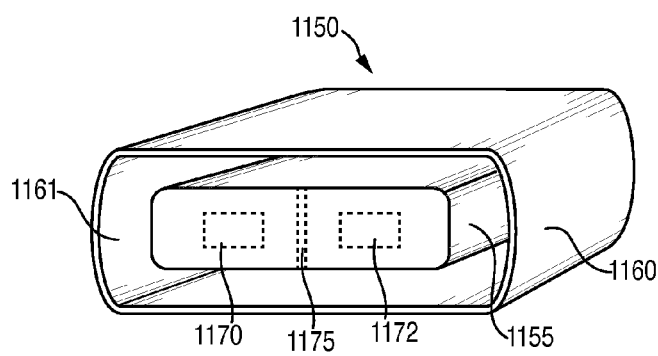
Figure 11G:
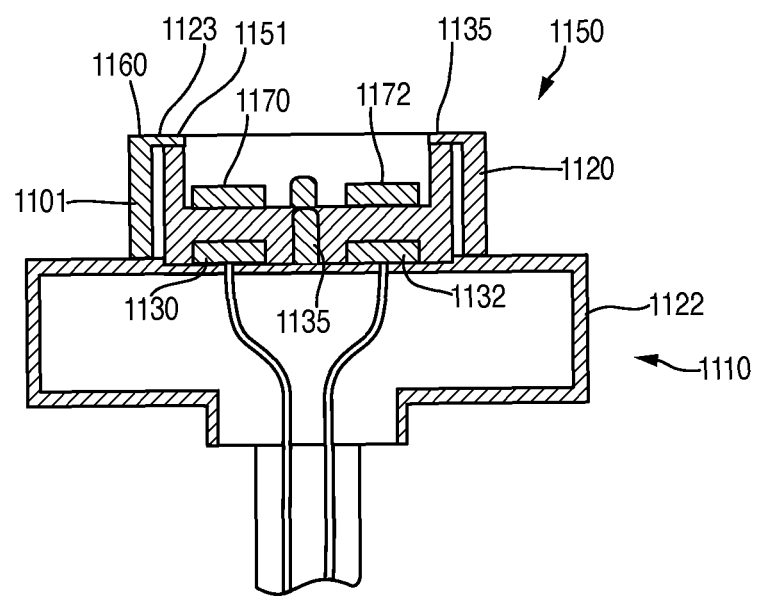
FIG. 11G shows an illustrative cross-sectional view of first and second connectors of FIGS. 11A-11F mated together.

FIGS. 11A-11C show different views of an illustrative first connector 1110 according to an embodiment. In particular, FIG. 11A shows a side view of connector 1110, FIG. 11B shows a top view, and FIG. 11C shows a cross-sectional view taken along lines C-C of FIG. 11A. FIGS. 11D-11F show different views of an illustrative second connector 1150 according to an embodiment. In particular, FIG. 11D shows a side view of second connector 1120, FIG. 11E shows a top view of the connector, with various components of the connector shown as dashed hidden lines, and FIG. 11F shows a perspective view of connector 1150. FIG. 11G shows an illustrative cross-sectional view of first and second connectors mated together.

First connector 1110 is shown to exhibit an outward physical appearance of a male connector. As shown, interface portion 1120 may be constructed so that it fits into interface portion 1160 of second connector 1150. Interface portion 1120 may abut or be integrated with housing member 1122. Interface portion 1120 can have an inner wall 1121 that defines a hollow space or cavity within interface 1120. This hollow space or cavity may receive member 1155 of second connector 1150. Thus, when first and second connectors are coupled together, the internal portion of interface member 1120 may encompass member 1155, but the outer portion of interface member 1120 may be encompassed by interface portion 1160. This is shown in FIG. 11G. In some embodiments, interface portion 1120 may be constructed from or include at least one magnet, including a permanent magnet, a rare earth magnet, or an electromagnet. In other embodiments, housing member 1122 may include at least one magnet (not shown).

EHF communication units 1130 and 1132 are mounted to printed circuit board 1133 and are positioned within inner wall 1121 of interface portion 1120. EHF Fence 1135 may exist between communication units 1130 and 1132 to function as a barrier that reduces or prevents cross-talk of EHF signals emanating from units 1130 and 1132. EHF communication units 1130 and 1132 may be connected to conductors 1134, which may extend into cable portion 1140. In some embodiments, EHF communication units 1130 and 1132 may be encapsulated with an EHF transmissive material that permits transmission of EHF signals, but protects units 1130 and 1132 from potentially harmful substances such as dirt and water.

Second connector 1150 exhibits an outward physical appearance of a female connector. As shown, interface portion 1160 may be constructed so that it receives interface portion 1120 (FIG. 11A) of first connector 1110 (FIG. 11A). In particular, inner wall 1161 may be dimensioned so that it fits around the outer dimensions of interface portion 1120. A hollow cavity may exist between inner wall 1161 and member 1155. Member 1155 may be dimensioned so that it fits within inner wall 1121 of interface portion 1120. This is shown in FIG. 11G. In one embodiment, interface portion 1160 may include one or more magnetics or may be constructed from a magnetic material. In another embodiment, one or more magnets (not shown) may be positioned adjacent to the back surface 1151 of connector 1150. In either embodiment, the magnets are operative to attract and retain connector 1110 within connector 1150.

Member 1155 may protrude from back surface 1151 of second connector 1150 to a predetermined distance from front surface 1152. Member 1155 may emulate a tongue-like member that extends from a surface. Member 1155 may have contained therein EHF communication units 1170 and 1172, which may be coupled to conductors 1174. EHF communication units 1170 and 1172 may be mounted to a printed circuit board (not shown). EHF Fence 1175 may exist between communication units 1170 and 1172 to function as a barrier that reduces or prevents cross-talk of EHF signals emanating from units 1170 and 1172. The distal end of member 1155, which is positioned at a predetermined distance from front surface 1152, may be positioned as such to maximize linkage of contactless EHF signals between EHF communication units of both connectors, when coupled together.

Referring now to FIG. 11G, it can be seen that an EHF shield is provided when connectors 1110 and 1150 are coupled together. Thus, all EHF signals emanating from units 1130, 1132, 1170, and 1172 are contained within the confines of interfaces 1120 and 1160. The EHF signals may be contained therein due to the shape and interlocking nature of the connectors, and the material composition of the connectors. As shown, a fully enclosed shield exists when connectors 1110 and 1150 are coupled together. In fact, the design of connectors 1110 and 1150 provides a double walled shield. A first wall of the shield can exist with inner surface 1121 and back surface 1151 when top surface 1123 of interface portion 1120 abuts back surface 1151 of connector 1150. A second wall of the shield can exist with the outer surface of interface 1120 and the inner surface 1161 of interface 1160. The shield's ability to contain EHF signal can be further augmented by selective use of any one or more of the three above-mentioned material compositions. For example, inner wall 1121 may be lined with a reflective material, and back surface 1151 may be lined with an absorptive material.

In some embodiments, when connectors 1110 and 1150 are coupled together, EHF fences 1135 and 1175 may contact each other to form a contiguous EHF fence. Since EHF fences are typically constructed from an electrically conductive material such as copper, gold, or silver, the mechanical interface between fences 1135 and 1175 can be used as a mechanism for detecting whether connectors 1110 and 1150 are coupled together. If desired, other contact mechanisms can be used to detect whether connectors 1110 and 1150 are coupled together. For example, pogo pins (i.e., spring loaded pins) can be integrated into one or more portions of connector 1110 (e.g., in interface portion 1120 or housing member 1122), and complementary contact pads can be integrated into one or more portions of connector 1150. Thus, when connectors 1110 and 1150 are connected together, the pogo pins can interface with the contact pads, which interface can be detected as a connector coupling. In some embodiments, the pogo pin/contact pad arrangement can also serve as a power transfer conduit.

Figure 12B:
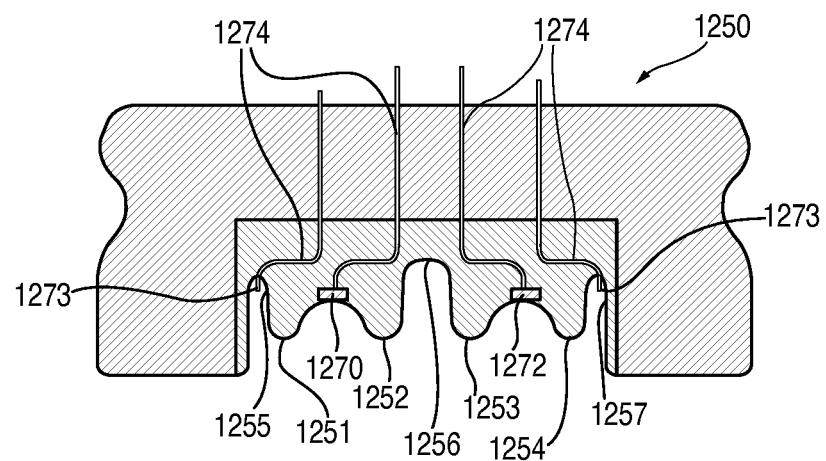
FIG. 12B shows a cross-sectional view of a second connector, according to an embodiment.
Figure 12A:
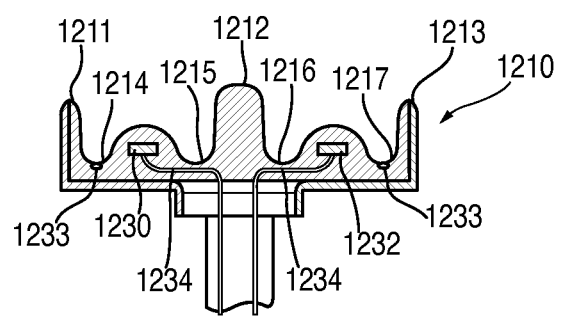
FIG. 12A shows a cross-sectional view of a first connector, according to an embodiment.

FIG. 12A shows a cross-sectional view of first connector 1210 according to an embodiment. First connector 1210 can include finger members 1211, 1212, and 1213, valley regions 1214-1217, EHF communication units 1230 and 1232, contact pads 1233, and conductors 1234. FIG. 12B shows a cross-sectional view of a second connector 1250 according to an embodiment. Second connector 1250 can include fingers 1251-1254, valley regions 1255-1257, EHF communication units 1270 and 1272, pins 1273, and conductors 1274. Contact pads 1233 and pins 1273 may be used detect physical presence of coupled connectors 1210 and 1250 and/or for transferring power.

Figure 12C:
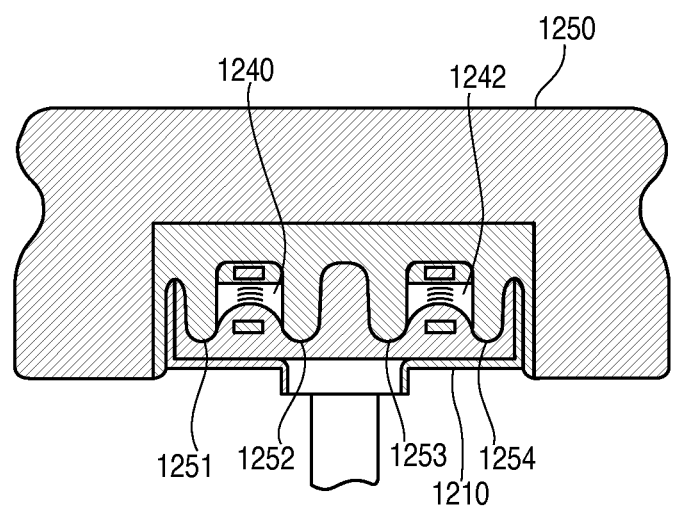
FIG. 12C shows a cross-sectional view of first and second connectors of FIGS. 12A and 12B coupled together, according to an embodiment.

FIG. 12C shows a cross-sectional view of first and second connectors 1210 and 1250 coupled together. In order to avoid overcrowding the FIG., certain features have been omitted such as conductors 1234 and 1274 and various other circuitry. Once connected, EHF communication units 1230 and 1232 can contactlessly communicate with EHF communication units 1270 and 1272, respectively, in an EHF shielded environment. The EHF shield may be formed when the finger members of each connector interlock with each other when coupled together. This interlocking can form a shield that prevents or substantially reduces EHF signal leakage out of the coupled connector and can also prevent or reduce cross-talk among adjacent EHF communication units. In particular, fingers 1211-1213 can fit into valley regions 1255-1257, respectively, and fingers 1251-1254 can fit into valley regions 1214-1247, respectively, when connectors 1210 and 1250 are coupled together. The fingers may fit relatively flush against each other and within their respective valleys. In some embodiments, connectors 1210 and 1250 may be held together via one or more magnets (not shown). In some embodiments, additional processing components may be included in one or both connectors 1210 and 1250.

When connectors 1210 and 1250 are coupled together, collimator regions 1240 and 1242 are formed therein. Collimator regions 1240 and 1242 can serve as isolated conduits or pathways for enabling EHF signals to communicate with their intended EHF units without interference or leakage. Collimator region 1240 can exist between fingers 1251 and 1252, and EHF units 1230 and 1270. Collimator region 1242 can exist between fingers 1253 and 1254, and EHF units 1232 and 1272. In some embodiments, the collimator side of fingers 1251-1254 may be lined with or constructed from an EHF reflective material.

Figure 13A:
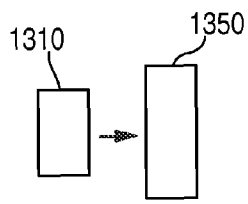
FIG. 13A shows an illustrative side view of first and second connectors in a non-attached state, according to an embodiment.
Figure 13B:
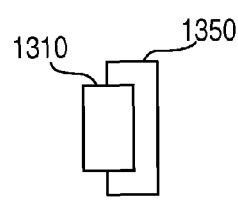
FIG. 13B shows an illustrative side view of first and second connectors in an attached state, according to an embodiment.
Figure 13C:
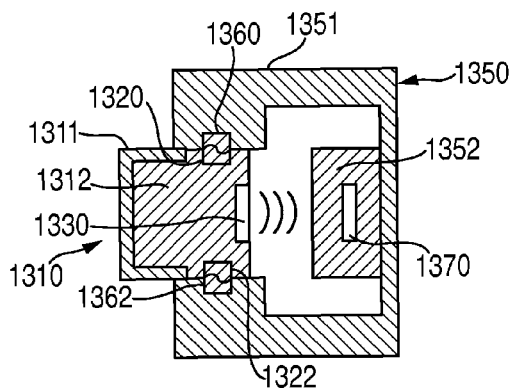
FIG. 13C shows an illustrative cross-sectional view of first and second connectors of FIGS. 13A and 13B in the attached state, according to an embodiment.

Reference is now made collectively to FIGS. 13A-13C. FIG. 13A shows an illustrative side view of first and second connectors 1310 and 1350 in a non-attached state. FIG. 13B shows an illustrative side view of first and second connectors 1310 and 1350 in an attached state. FIG. 13C shows an illustrative cross-sectional view of first and second connectors 1310 and 1350 in the attached state. FIG. 13C also shows EHF communications unit 1330, which is part of connector 1310, and EHF communication unit 1370, which is part of connector 1350, and illustrative material compositions selected for each connector. EHF absorptive materials may be incorporated in both connectors, and are shown by cross-hatchings 1311 and 1351. The EHF absorptive cross-hatchings are shown to abut each other when connectors 1310 and 1350 are connected. This may prevent EHF signals from leaking out of the mated connection. EHF transmissive materials may also be incorporated with both connectors. The transmissive materials are shown by cross-hatchings 1312 and 1352 and may encapsulate respective EHF communication units. EHF reflective materials are not shown, but they may exist on the inner walls of connector 1350.

FIG. 13C also shows transducers 1320 and 1322, which are part of connector 1310 and transducers 1360 and 1362, which are part of connector 1350. Only four such transducers are shown, but it is understood any suitable number of transducers may be incorporated into connectors 1310 and 1330. Transducers 1320, 1322, 1360, and 1362 may be operative to generate an electrical impulse in response to an applied pressure thereto. In some embodiments, transducers 1320, 1322, 1360, and 1362 can be constructed from a piezoelectric material. As such, transducers 1320, 1322, 1360, and 1362 can be positioned on interference fit locations on connectors 1310 and 1330. This way, when connectors 1310 and 130 are mated with each other, the interference fit may exert pressure against transducers 1320, 1322, 1360, and 1362, thereby invoking an electrical response. This electrical response can be used to signify that a fully shielded connection has been made and currently exists among the two connectors. Similarly, when the connectors are pulled apart, the release of pressure exertion on transducers 1320, 1322, 1360, and 1362 can also generate an electrical response, which can signify that a fully shielded connection no longer exists.

In some embodiments, the impulse response generated by the transducers can power one or more EHF communication units in each connector. This advantageously can eliminate a need to use another power source to power the EHF communication units. In embodiments in which a finite amount of power is generated by the transducers, there may be sufficient power to enable a data transaction between two connectors. That is, responsive to a connection event, the generated power can turn on the EHF communication units, beacon, establish connection, transmit data, and shut down. In yet other embodiments, sufficient power may be generated to activate the EHF communications units and to instruct another power source to supply power.

Figure 14A:
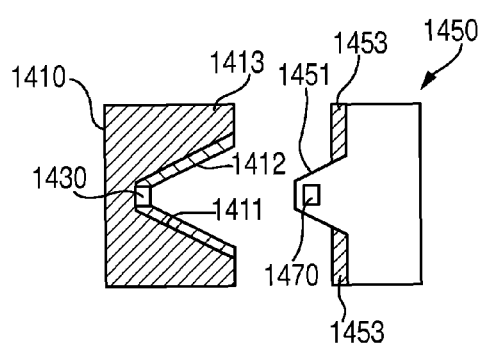
FIG. 14A shows cross-sectional views of illustrative first connector and illustrative second connector, according to an embodiment.
Figure 14B:
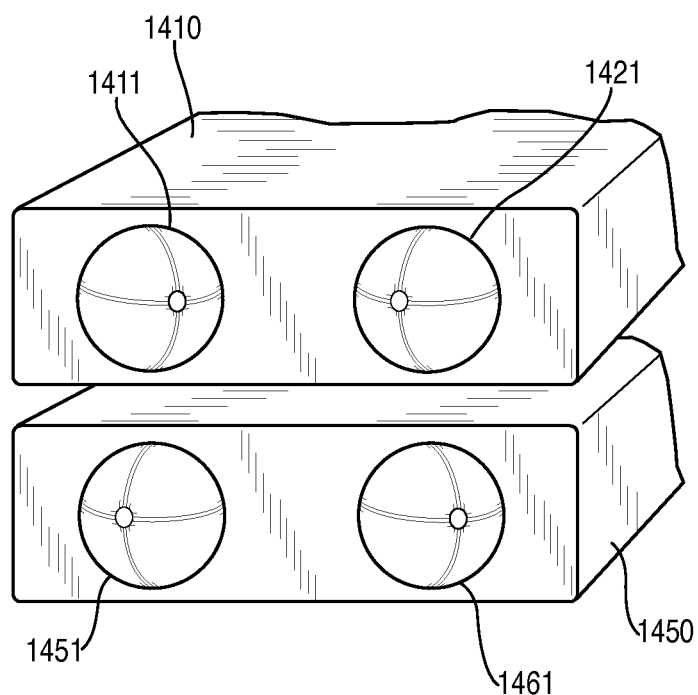
FIG. 14B shows illustrative perspective views of the first and second connectors of FIG. 14A, according to an embodiment.

Reference is now made collectively to FIGS. 14A-14B. FIG. 14A shows cross-sectional views of illustrative first connector 1410 and illustrative second connector 1450, according to an embodiment. First connector 1410 can include EHF communication unit 1430, which is positioned at the base of female cone region 1411. Female cone region 1411 can be lined with EHF reflective material 1412, and a portion of connector 1410 abutting cone region 1411 can be constructed from EHF absorptive material 1413. Second connector 1450 can include EHF communication unit 1470, which is located in a tip portion of male cone region 1451. EHF absorptive material 1453 can extend beyond an outer periphery of male cone region 1451 such that when connectors 1410 and 1450 are mated together, the EHF absorptive materials of both connectors interface with each other to form a EHF shield.

FIG. 14B shows illustrative perspective views of connectors 1410 and 1450. As shown, connector 1410 can include female cone region 1411 and male cone region 1421, and connector 1450 can include male cone region 1451 and female region 1461. Inclusion of both female and male cone members in each connector is merely exemplary, but can ensure the connectors are attached in a predetermined fashion. If desired, one connector can harbor all male cone members or all female cone members. It is understood that any suitable combination of male and female members may be incorporated into a connector.

Transducers, similar to transducers 1320 or 1360 of FIG. 13C, may be incorporated into one or both of connectors 1410 and 1450. For example, one or more transducers may be incorporated into the cone regions such that when the two cone regions engage each other, sufficient pressure is exerted on the transducers to generate an impulse response.

Figure 15:
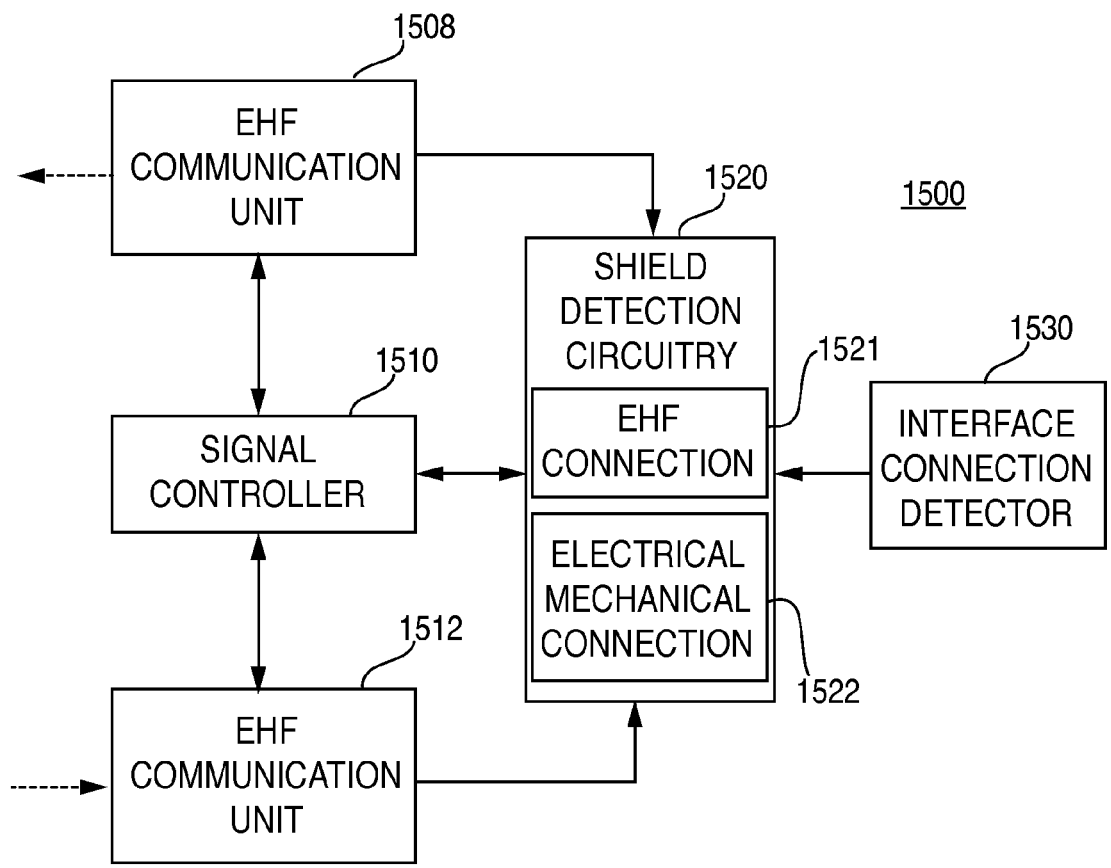
FIG. 15 shows an illustrative schematic diagram of connector assembly that discerns whether an EHF shield is present, according to an embodiment.

FIG. 15 shows an illustrative schematic diagram of connector assembly 1500 that discerns whether an EHF shield is present, according to an embodiment. As shown, connector assembly 1500 can include EHF communication units 1508 and 1512, signal controller 1510, shield detection circuitry 1520, and interface connection 1530. EHF communication units 1508 and 1512, and signal controller 1510 may be similar to EHF communication units 108 and 112, and signal controller 110 of FIG. 1. Shield detection circuitry 1520 is operative to determine whether connector assembly 1500 is operating in an EHF shielded environment. For example, an EHF shielded environment may exist when connector assembly 1500 is securely mated to another connector assembly (e.g., in a manner similar to those shown in FIGS. 11G, 12C, and 13C). As another example, an EHF shielded environment may exist as a transitory moment in which two connectors are momentarily positioned with respect to each other but not necessarily securely attached to each other. As discussed above, it may be desirable to prevent EHF signaling when a connector assembly is not operating in a shielded environment. In some embodiments, the connector assembly may emit a beacon signal to alert other connector assemblies of its presence. The beaconing signal can be emitted in a non-shielded environment. In addition, the beacon signal can be part of the EHF signaling range, but its transmission is legal and complies with regulatory bodies such as the FCC. Once presence of a shield is established, the connector assembly can enable a diverse range of EHF signaling, including ranges that may not otherwise be permitted in a non-shielded environment. The connector assembly can continuously engage in EHF signaling with another connector assembly when the shielded environment is present, but once shield detection circuitry 1520 detects any compromise in the shielding, it may immediately cause the connector assembly to cease EHF signaling. In some embodiments, shield detection circuitry 1520 can cause the connector assembly to cease EHF signaling before the shield is compromised, to prevent or reduce inadvertent EHF signaling leakage.

Shield detection circuitry 1520 can detect presence of an EHF shield using any one of several different approaches. One approach can include monitoring various characteristics of one or more EHF connections between two connectors, as illustrated by box 1521. Another approach can include monitoring an electrical/mechanical connection between two connectors, as illustrated by box 1522. As yet another approach can include monitoring for impulse responses generated by one or more transducers (not shown in the FIG.). In some embodiments, shield detection circuitry 1520 may process inputs received from signal controller 1510 and interface connection detector 1530.

In the EHF connection approach, detection circuitry 1520 can receive signals from EHF communication units 1508 and/or 1512 and ascertain the signal strength existing between two connector assemblies. Detection circuitry 1520 can infer connector assembly 1500 is connected to another connector assembly if the signal strength exceeds a predetermined threshold, and that the connectors are not mated when the signal strength is below the predetermined threshold. Shield detection circuitry 1520 can transmit "connect" and "disconnect" commands to signal controller 1510 using the EHF signal approach, the electrical/mechanical approach, or a combination thereof.

Figure 16A:
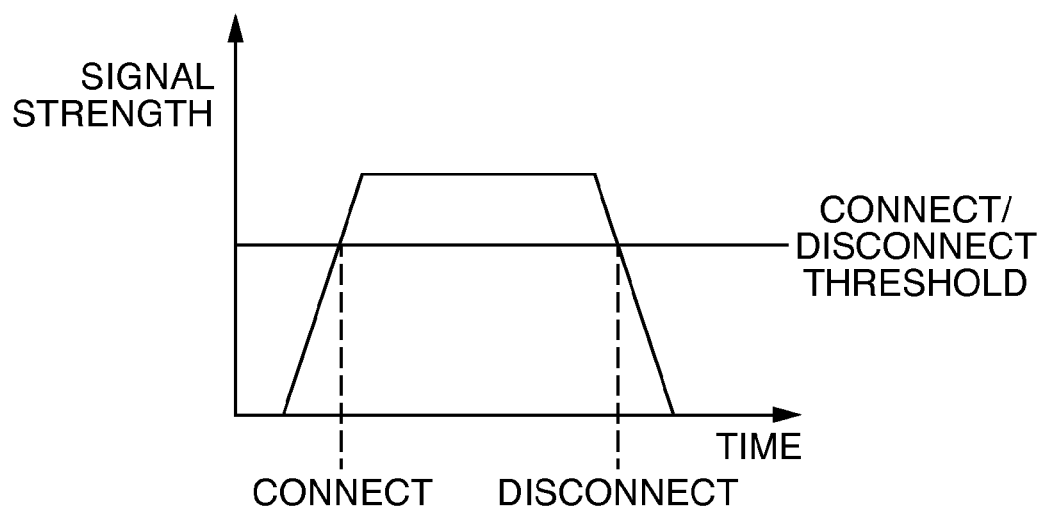
FIG. 16A shows an illustrative timing diagram of signal strength versus time, according to an embodiment.

FIG. 16A shows an illustrative timing diagram of signal strength versus time, according to an embodiment. The signal strength can be indicative of the strength of an EHF signal connection between connector assemblies. As shown, when the signal strength exceeds the connect/disconnect threshold, detection circuitry 1520 can provide a "connect" signal to signal controller 1510 indicating that a connection substantial enough to provide a shielded EHF environment is present and that signal controller 1510 can permit EHF communication units 1508 and 1512 to engage in EHF contactless communication. Shield detection circuitry 1520 may maintain this "connect" status until the signal strength drops below the connect/disconnect threshold, at which point detection circuitry 1520 can transmit a "disconnect" signal to signal controller 1510. In response to receiving the "disconnect" signal, signal controller 1510 can instruct EHF communication units 1508 and 1512 to cease EHF contactless communication.

Figure 16B:
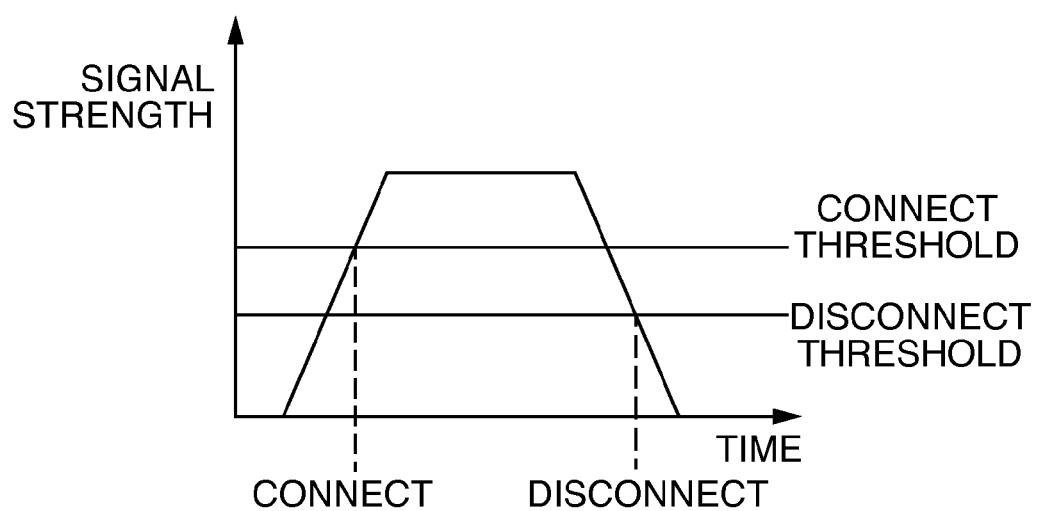
FIG. 16B shows another illustrative timing diagram of signal strength versus time, according to an embodiment.

FIG. 16B shows an illustrative timing diagram of signal strength versus time, according to an embodiment. As shown, two different thresholds are imposed to determine connect and disconnect events. The connect threshold may be set at a higher threshold than the disconnect threshold to provide hysteresis in connect and disconnect events. Thus, in operation, circuitry 1520 can send a "connect" signal to signal controller 1510 when the signal strength exceeds the connect threshold, and then sends a "disconnect" signal when the signal strength drops below the disconnect threshold. The timing diagrams shown in FIGS. 16A and 16B can represent hysteresis in wireless connections. Additional details on wireless connections with virtual hysteresis can be found, for example, in commonly own, commonly assigned, U.S. patent application Ser. No. 14/026,913, filed Sep. 13, 2013, the disclosure of which is hereby incorporated by reference herein in its entirety.

Referring back to FIG. 15, the EHF connection approach may be implemented using data processing capabilities of signal controller 1510. In some embodiments, depending on construction of the connector and how EHF signals are transmitted by EHF communication units 1508 and 1512, there may be instances in which cross-talk exists between units 1508 and 1512. In particular, cross-talk may exist when there is no connection between two connectors. Signal controller 1510 may be able to discern whether such cross-talk exists. Since signal controller 1510 knows a signal pattern being emitted from a transmitting EHF unit, and if a receiving EHF unit receives that same signal pattern, signal controller can infer that there is cross-talk. However, when two connectors are moved close enough to each other or are physically coupled, that cross-talk may cease to exist. When, the cross-talk is no longer detected, signal controller 1510 may infer that the two connectors are coupled and are fully shielded.

In another approach, signal controller 1510 can analyze time of flight telemetry of signals transmitted from one connector to another. The propagation speed of EHF signals can be a constant in an equation where distance is equal to the product of speed and time. Using the known factor of speed, signal controller 1510 can monitor time of flight to calculate the distance between the two connectors. Thus, when the time flight falls below a "shield present" threshold, signal controller 1510 can inform shield connection circuitry 1520 that a shielded connection exists. Additional details on how time of flight can be used to determine proximity of connectors to one another can be found, for example, in commonly owned, commonly assigned, U.S. Patent Application Publication Nos. 20120319890 and 20120319496, both disclosures of which are incorporated by reference in their entireties.

The electrical/mechanical connection approach can be ascertained based on inputs received from interface connection detector 1530. Interface connection detector 1530 can include any sort of mechanism, whether mechanical, electrical, electrical/mechanical, or optical, that detects whether one connector assembly is coupled to another electrical assembly. Examples of detector 1530 can include a switch that is triggered when a connector is coupled to another connector, a contact pad or pogo pin that forms an electrical connection when a connector is coupled to another connector, a transducer that generates an impulse response to an applied pressure event, and an optical detector that detects presence of another connector. Examples of such detectors have been discussed above in connection with FIG. 11 (e.g., fences 1135 and 1175), FIG. 12 (e.g., pogo pins 1273 and contact pads 1233), and FIG. 13C (e.g., transducers 1320, 1322, 1360, and 1362). In operation, shield detection circuitry 1520 can provide "connect" or "disconnect" commands to signal controller 1510 based on signals provided by interface connection detector 1530.

The placement of interface connection detector 1530 can be such that an EHF shield is present among the coupled connectors before the detector 1530 registers that the two connectors are in fact coupled together. This can prevent premature activation of EHF contactless communications when two connectors are coupled together because the EHF shield is present by the time detector 1530 detects the coupling of the connectors. Moreover, such placement can ensure EHF contactless communications cease immediately after the two connectors are at least partially disconnected from each other. Thus, even though contactless communication may be occurring between the two connectors at the moment of disconnect, the placement of detector 1530 can trigger cessation of the EHF communication while the EHF shield is present, thereby preventing or substantially reducing any EHF leakage.

Connector assembly 1500 may be used in transient connections. Transient connections are temporary in nature and do not encompass connector solutions that securely hold connectors in place once they are engaged. For example, a transient connection can be akin to a swipe or sliding connection in which one connector passes through another connector. As another example, transient connections may employ narrow band beacons. The narrow band beacon may be sufficiently focused such that when two connectors detect each other via this beacon, they may be in a fully shielded configuration. In addition, transient connections may only require relatively modest quantities of data transfer in order to accomplish a desired transaction. For example, such a transaction can be akin to a credit card swipe, an NFC transaction, a security entrance transaction, password verification, user identification, etc.

EHF leakage can be prevented, reduced or at least partially mitigated using other approaches that filter EHF signals based on the wavelength of such signals according to various embodiments. For a signal having a frequency, f, and is traveling at a constant speed, that signal will have a wavelength. Thus, in order for a signal of frequency, f, to travel freely through space, it may require spacing that exceeds the wavelength of the signal. The spacing refers to size of freespace through which the EHF signal travels. If the spacing is decreased to less than the wavelength, then that signal may not be able to pass through. As the spacing is further decreased below the wavelength, the more effective it may become in blocking and/or preventing the signal from passing through. FIGS. 17-20 show several embodiments that incorporate fractional wavelength spacing to mitigate, reduce, or prevent unwanted EHF signal leakage.

Figure 17:
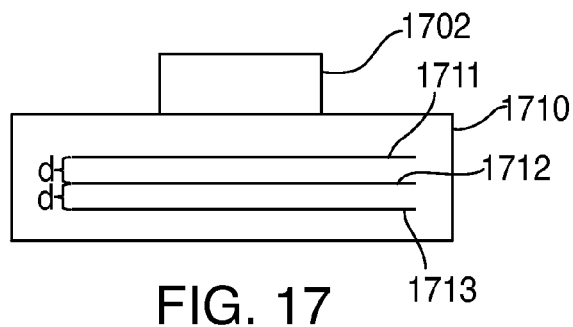
FIG. 17 shows an illustrative cross-sectional view of EHF communication unit mounted on circuit board according to an embodiment.

FIG. 17 shows an illustrative cross-sectional view of EHF communication unit 1702 mounted on circuit board 1710 according to an embodiment. As shown, circuit board 1710 can include ground planes 1711-1713. The distance, d, between adjacent ground planes 1711-1713 may be based on the frequency of the EHF signal transmitted and/or received by communication unit 1702. In particular, the distance, d, may be a fraction (e.g., ½, ⅓, ¼) of the wavelength of the EHF signal transmitted or received by communication unit 1702. Thus, by incorporating ground planes 1711-1713 in this spatial relationship with respect to each other, EHF shielding can be achieved. For example, because circuit board 1710 may serve as a transmissive medium for EHF signals, inclusion of ground planes 1711-1713 can prevent EHF signals from transmitting through and/or around circuit board 1710. It should be appreciated that any suitable number of ground planes may be used to assist in preventing or substantially reducing EHF signal leakage.

Figure 18:
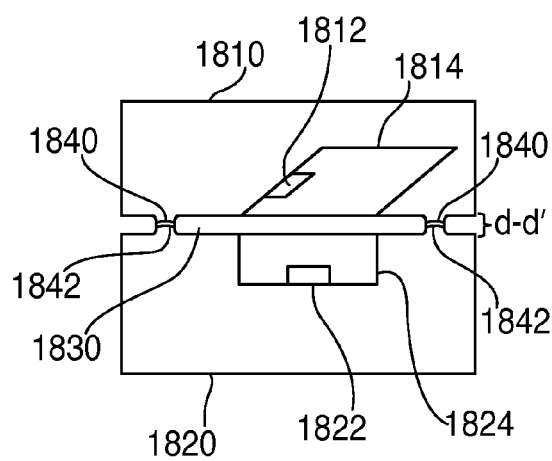
FIG. 18 shows an illustrative cross-sectional view of two structures, each containing an EHF communication unit, disposed adjacent to each other in a manner that leaves a gap existing therebetween, according to an embodiment.

FIG. 18 shows an illustrative cross-sectional view of two structures, each containing an EHF communication unit, disposed adjacent to each other in a manner that leaves a gap existing therebetween, according to an embodiment. As shown, structure 1810 can include EHF communication unit 1812 mounted within connector region 1814, and structure 1820 can include EHF communication unit 1822 mounted within connector region 1824. Gap 1830 exists between connector regions 1814 and 1824 to illustrate an embodiment in which connectors are not physically touching each other when their respective structures are coupled together. The distance of gap 1830 may range between d and d'. The distance may vary due to manufacturing tolerances of structures 1810 and 1820 and/or the manner in which structures 1810 and 1820 are coupled to each other. Regardless of the variance, the distance of gap 1830 may be a fraction of the wavelength of the EHF signals being transmitted and/or received by communication units 1812 and 1822. Such sizing of gap 1830 can effectively prevent or reduce EHF signal leakage from emanating away from structures 1810 and 1820.

If desired, interfacing portions 1840 and 1842 may be incorporated into structures 1810 and 1820, respectively, to provide closure to gap 1830 when structures 1810 and 1820 are coupled together. Interfacing portions 1840 and 1842 may include reflective and/or adsorptive materials to prevent or substantially reduce EHF signal leakage. For example, the material can include an open cell foam coated with or constructed from an EHF absorptive material. In addition, the open cell construction of the foam may have interstitial spacing that is a fraction of the EHF signal wavelength, thereby further enhancing its EHF signal blocking capacity.

Figure 19:
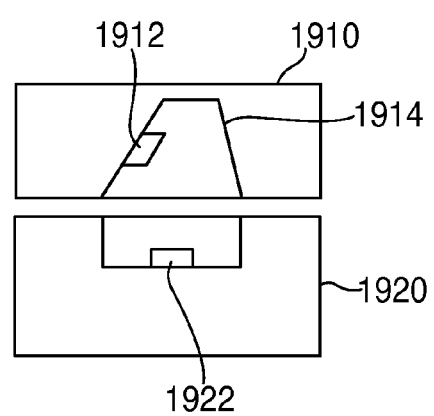
FIG. 19 shows an alternative illustrative cross-sectional view of two structures, each containing an EHF communication unit, disposed adjacent to each other in a manner that leaves a gap existing therebetween, according to an embodiment.

FIG. 19 shows another illustrative cross-sectional view of two structures, each containing an EHF communication unit (unit 1912 and unit 1922), disposed adjacent to each other in a manner that leaves a gap existing therebetween, according to an embodiment. Structures 1910 and 1920 are similar to structures 1810 and 1820 of FIG. 18. A difference between the two is that connector region 1914 is shaped differently than connector region 1814. In particular, connector region 1914 may have a tapered shape, whereas connector region 1814 has a rectilinear shape. The tapered shape may assist in blocking EHF signals because the shrinking size of the connector shield makes it more difficult for EHF signals to propagate. This can be used, for example, to prevent or reduce EHF penetration further into structure 1910.

Figures 20A, 20B:
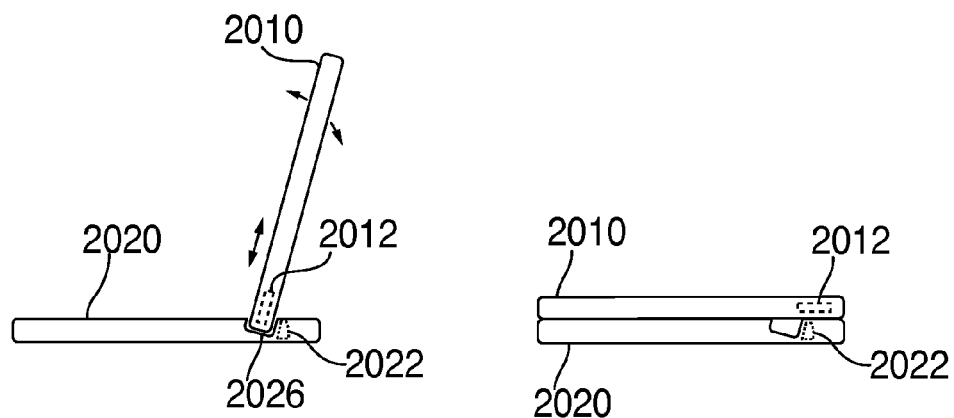
FIGS. 20A and 20B show illustrative views of a tablet interfacing with a docking station, according to various embodiments.

FIGS. 20A and 20B show illustrative views of a tablet 2010 interfacing with a docking station 2020, according to various embodiments. Tablet 2010 may include interactive display (not shown) for simultaneously displaying information and processing inputs (e.g., via stylus or one or more fingers). Tablet 2010 may also include one or more EHF communication units 2012 for contactlessly transmitting and/or receiving data from another device. Docking station 2020 can be any suitable device for communicating data to and/or receiving data from tablet 2010. In one embodiment, docking station 2020 can be an input device such as a keyboard. Docking station 2020 can include slot 2026 for receiving and holding tablet 2010 in place, as shown in FIG. 20A. If desired, slot 2026 may enable tablet 2010 to pivot. In addition, docking station 2020 can include one or more EHF communication units 2022 (only one of which is shown), which may form a close proximity communication link with EHF communication unit 2012 when tablet 2010 is placed in close proximity of docking station 2020. FIG. 20B shows that tablet 2010 may be secured to docking station 2020 in a face down position (e.g., so that the tablet and docking station can be stowed away).

FIGS. 20A and 20B further illustrate how a controlled gap size between coupled structures can be effective in preventing or substantially reducing unwanted EHF signal leakage. In particular, in FIG. 20A, the gap existing between slot 2026 and tablet 2010 may be a fraction of the wavelength of the EHF signals being transmitted and/or received among communication units 2012 and 2022. Also, in FIG. 20B, a gap may exist between tablet 2010 and docking station 2020. This gap may be a fraction of the wavelength of the EHF signals being transmitted and/or received among communication units 2012 and 2022. Shielding may also be provided for some areas around the slot 2026 and/or the tablet 2010 to minimize or avoid EHF electromagnetic signal spillage outside the gap.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A first extremely high frequency (EHF) shielded connector assembly configured to be coupled with a second EHF shielded connector assembly, the first EHF connector assembly comprising:
   a first EHF communication unit operative to contactlessly communicate EHF signals with a second EHF communication unit included in the second EHF shielded connector assembly; and
   a connector interface comprising:
      a configuration to interface with a respective connector interface of the second EHF shield connector assembly; and
      a plurality of material compositions that, in conjunction with the configuration, provides shielding to reduce EHF signal leakage when the first EHF assembly connector is coupled to the second EHF connector assembly and the first EHF communication unit is contactlessly communicating EHF signals with the second EHF communication unit, wherein the plurality of material compositions comprises a reflective EHF material.

2. The first EHF connector assembly of claim 1, wherein the plurality of material compositions comprises a transmissive EHF material.

3. The first EHF connector assembly of claim 1, wherein the plurality of material compositions comprises an absorptive EHF material.

4. The first EHF connector assembly of claim 1, wherein the configuration comprises a male member including a cavity therein, wherein the EHF signals are transmitted within the cavity when the first EHF communication unit is contactlessly communicating EHF signals with the second EHF communication unit.

5. The first EHF connector assembly of claim 1, wherein the configuration comprises a plurality of finger members operative to interlock with finger members of the respective connector interface.

6. The first EHF connector assembly of claim 1, wherein the configuration comprises a conical cavity member including a top plane and a bottom plane, wherein the first communication unit is positioned adjacent to the bottom plane.

7. The first EHF connector assembly of claim 1, wherein the connector interface comprises an interface connection detector operative to determine whether the first EHF connector assembly is physically coupled to the second EHF connector assembly.

8. The first EHF connector assembly of claim 1, wherein the configuration comprises a female member including a tongue member contained therein, wherein the first EHF communication unit is secured with the tongue member.

9. The first EHF connector assembly of claim 1, wherein the configuration comprises a conical protruding member including a top plane and a bottom plane, wherein the first communication unit is positioned adjacent to the top plane.

10. A first extremely high frequency (EHF) shielded connector assembly configured to be coupled with a second EHF shielded connector assembly, the first EHF connector assembly comprising:
   a first EHF communication unit operative to contactlessly communicate EHF signals with a second EHF communication unit included in the second EHF shielded connector assembly; and
   a connector interface comprising:
      a configuration to interface with a respective connector interface of the second EHF shield connector assembly; and
      a plurality of material compositions that, in conjunction with the configuration, provides shielding to reduce EHF signal leakage when the first EHF assembly connector is coupled to the second EHF connector assembly and the first EHF communication unit is contactlessly communicating EHF signals with the second EHF communication unit;
   a third EHF communication unit operative to contactlessly communicate EHF signals with a fourth EHF communication unit included in the second EHF shield connector assembly, wherein the connector interface reduces EHF signal leakage when the first EHF assembly connector is coupled to the second EHF assembly connector and the third EHF communication unit is contactlessly communicating EHF signals with the fourth EHF communication unit.

11. The first EHF connector assembly of claim 10, further comprising an EHF fence positioned between the first and second EHF communication units to prevent cross-talk between the first and second EHF communication units.

12. The first EHF connector assembly of claim 11, wherein the EHF fence functions as an interface connection detector.

13. A device comprising:
   a connector for interfacing with another device;
   at least one EHF communication unit operative to contactlessly communicate EHF signals with at least one respective EHF communication unit included in the other device;
   a controller operative to control operation of the at least one EHF communication unit; and
   shield detection circuitry coupled to the controller and operative to detect whether an EHF shield is present.

14. The device of claim 13, wherein the shield detection circuitry monitors a signal strength of the EHF signals being contactlessly communicated between the at least one EHF communication unit and the at least one respective EHF communication unit to detect whether the EHF shield is present.

15. The device of claim 14, wherein the shield detection circuitry is operative to confirm presence of the EHF shield when the signal strength exceeds a first threshold.

16. The device of claim 15, wherein the shield detection circuitry is operative to confirm non-existence of the EHF shield when the signal strength falls below a second threshold.

17. The device of claim 16, wherein the first and second thresholds are the same.

18. The device of claim 16, wherein the first threshold is greater than the second threshold.

19. The device of claim 13, further comprising:
an interface connection detector for determining whether the connector is physically coupled to the other device, the interface connection detector coupled to the shield detection circuitry; and
wherein the shield detection circuitry is operative to detect whether an EHF shield is present based on signals received from the interface connection detector.

20. The device of claim 19, wherein the interface connection detector is positioned within the connector such that the EHF shield is present prior to the interface connection detector detecting that the connector is physically coupled to the other device and such that the EHF shield is present after the interface connection detector determines that the connector is being disconnected from the other device.

21. The device of claim 13, wherein the controller is operative to:
enable contactless EHF communications when the shield detection circuitry determines that the EHF shield is present; and
disable contactless EHF communications when the shield detection circuitry determines that the EHF shield is not present.

22. The device of claim 13, wherein a user is notified, such as by a display, sound, light, when a predefined signal threshold is met.

23. The device of claim 13, wherein a user is notified, such as by a display, sound, light, when a predefined signal threshold is not met.

24. A first extremely high frequency (EHF) shielded connector assembly configured to be coupled with a second EHF shielded connector assembly, the first EHF connector assembly comprising:
a first EHF communication unit operative to contactlessly communicate EHF signals with a second EHF communication unit included in the second EHF shielded connector assembly; and
a connector interface comprising:
a configuration to interface with a respective connector interface of the second EHF shield connector assembly; and
a plurality of material compositions that, in conjunction with the configuration, provides shielding to reduce EHF signal leakage when the first EHF assembly connector is coupled to the second EHF connector assembly and the first EHF communication unit is contactlessly communicating EHF signals with the second EHF communication unit, wherein the plurality of material compositions comprises an absorptive EHF material.

25. The first EHF connector assembly of claim 24, wherein the plurality of material compositions comprises a transmissive EHF material.

26. The first EHF connector assembly of claim 24, wherein the configuration comprises a male member including a cavity therein, wherein the EHF signals are transmitted within the cavity when the first EHF communication unit is contactlessly communicating EHF signals with the second EHF communication unit.

27. The first EHF connector assembly of claim 24, wherein the configuration comprises a conical cavity member including a top plane and a bottom plane, wherein the first communication unit is positioned adjacent to the bottom plane.

28. The first EHF connector assembly of claim 24, wherein the configuration comprises a conical protruding member including a top plane and a bottom plane, wherein the first communication unit is positioned adjacent to the top plane.

* * * * *